US007702563B2

(12) United States Patent
Balson et al.

(10) Patent No.: US 7,702,563 B2
(45) Date of Patent: Apr. 20, 2010

(54) INTEGRATED ELECTRONIC EXCHANGE OF STRUCTURED CONTRACTS WITH DYNAMIC RISK-BASED TRANSACTION PERMISSIONING

(75) Inventors: William E. Balson, Los Altos Hills, CA (US); Gordon C. Rausser, Berkeley, CA (US); Laura R. Craft, Berkeley, CA (US); Graydon L. Barz, New York, NY (US)

(73) Assignee: OTC Online Partners, Emeryville, CA (US)

( * ) Notice: Subject to any disclaimer, the term of this patent is extended or adjusted under 35 U.S.C. 154(b) by 1664 days.

(21) Appl. No.: 10/167,225

(22) Filed: Jun. 10, 2002

(65) Prior Publication Data
US 2003/0033240 A1 Feb. 13, 2003

Related U.S. Application Data

(60) Provisional application No. 60/297,484, filed on Jun. 11, 2001, provisional application No. 60/300,584, filed on Jun. 22, 2001.

(51) Int. Cl.
*G06Q 40/00* (2006.01)
(52) U.S. Cl. .......................................... 705/37; 705/35
(58) Field of Classification Search ............... 705/35–45
See application file for complete search history.

(56) References Cited

U.S. PATENT DOCUMENTS 4,903,201 A   2/1990   Wagner ....................... 364/408
5,819,237 A   10/1998  Garman ........................ 705/36
5,915,209 A   6/1999   Lawrence ................... 455/31.2
5,924,082 A   7/1999   Silverman et al. ............... 70/37
5,924,083 A   7/1999   Silverman et al. .............. 705/37
5,963,923 A   10/1999  Garber ......................... 705/37
6,016,483 A   1/2000   Rickard et al. ................ 705/37
6,029,146 A   2/2000   Hawkins et al. ............... 705/35

(Continued)

FOREIGN PATENT DOCUMENTS

WO    WO 0048109    *   8/2000

(Continued)

OTHER PUBLICATIONS

Friedman, Dictionary of Buisness Terms, Fourth Edition, 7 pgs.*

(Continued)

*Primary Examiner*—Kambiz Abdi
*Assistant Examiner*—Sarah M Monfeldt
(74) *Attorney, Agent, or Firm*—Beyer Law Group LLP

(57) ABSTRACT

A computer implemented method for negotiating contracts between a plurality of participants is provided. An order is received from a first participant of the plurality of participants. Position risk of the first participant is calculated by accessing data regarding the first participant and using the data regarding the first participant in a parametric variable equation modified by control values from a simulation model, to calculate the position risk of the first member. The order is blocked, if the position risk of the first participant is in a first condition for the first participant. The order is made available for forming into a contract, if the position risk of the first participant is in a second condition for the first participant.

13 Claims, 18 Drawing Sheets

U.S. PATENT DOCUMENTS

| | | | | |
|---|---|---|---|---|
| 6,061,662 | A | 5/2000 | Makivic | 705/36 |
| 6,119,103 | A | 9/2000 | Basch et al. | 705/35 |
| 6,122,623 | A | 9/2000 | Garman | 705/36 |
| 6,134,600 | A | 10/2000 | Liu | 709/316 |
| 6,195,647 | B1* | 2/2001 | Martyn et al. | 705/36 R |
| 6,278,981 | B1* | 8/2001 | Dembo et al. | 705/36 R |
| 6,317,727 | B1 | 11/2001 | May et al. | |
| 6,421,653 | B1* | 7/2002 | May | 705/36 R |
| 7,165,045 | B1* | 1/2007 | Kim-E | 705/37 |
| 7,249,091 | B2 | 7/2007 | Kinney et al. | |
| 7,376,614 | B1* | 5/2008 | Scheinberg et al. | 705/37 |
| 2002/0026403 | A1* | 2/2002 | Tambay et al. | 705/37 |
| 2002/0046145 | A1* | 4/2002 | Ittai | 705/36 |
| 2002/0046152 | A1* | 4/2002 | Kinney et al. | 705/37 |
| 2002/0077947 | A1* | 6/2002 | Ward et al. | 705/36 |

FOREIGN PATENT DOCUMENTS

| | | | |
|---|---|---|---|
| WO | WO 01/08057 | * | 2/2001 |
| WO | WO 02/052369 | * | 7/2002 |

OTHER PUBLICATIONS

Board of Trade Clearing Corporation to Process Trades For Opt4 Business Editors. Business Wire. New York: Oct. 24, 2000. p. 1.*

Opt4 Derivatives and The Board of Trade Clearing Corporation Completion of Testing of Real-time Link of OTC Marketplace to The Clearing Corporation Demonstration of Customized Trading and STP PR Newswire. New York: Mar. 15, 2002. p. 1.*

Opt4 Selects NextSet Technology to Build B2B Derivatives Platform Business Editors/High-Tech Writers. Business Wire. New York: Nov. 6, 2000. p. 1.*

U.S. Appl. No. 60/297,484, filed Jun. 11, 2001, with filing receipt.

U.S. Appl. No. 60/300,584, filed Jun. 22, 2001, with filing receipt.

Avellaneda et al., "Weighted Monte Carlo: A New Technique for Calibrating Asset-Pricing Models", International Journal of Theoretical and Applied Finance, vol. 4, No. 1, 2001, 1 page.

Simons, "The Use of Value at Risk by Institutional Investors", New England Economic Review, Nov./Dec. 2000, pp. 20-30.

Duffie et al., "An Overview of Value at Risk", Preliminary Draft, Jan. 21, 1997, pp. 1-85.

Financial Markets Analysis and Surveillance Division, "Evaluation of Value at Risk-Models", Guidelines on Market Risk, vol. 3, Sep. 1999, 57 pages.

Shimko, "Collateral Damage", End-User's Guide, Risk Publications, vol. 11, No. 9, Sep. 1998, 2 pages.

Lopez, "Regulatory Evaluation of Value-at-Risk Models", The Wharton Financial Institutions Center, Draft Date: Sep. 9, 1996, 34 pages.

J.P. Morgan/Reuters, "RiskMetrics™—Technical Document", Fourth Edition, Dec. 1996, 52 pages.

Srinivasan et al., "Improved Techniques for Using Monte Carlo in VaR Estimation", Jul. 4, 2001, pp. 1-29.

Federal Reserve System Task Force on Internal Credit Risk Models, "Credit Risk Models at Major U.S. Banking Institutions: Current State of the Art and Implications for Assessments of Capital Adequacy", May 1998, 58 pages.

Fallon, "Calculating Value-at-Risk", The Wharton Financial Institutions Center, Jan. 22, 1996, 39 pages.

Kupiec et al., "Regulatory Competition and the Efficiency of Alternative Derivative Product Margining Systems", Jun. 11, 1996, 34 pages.

Kupiec, "Margin Requirements, Volatility, and Market Integrity: What have learned since the Crash?", Apr. 1997, 40 pages.

Dangl et al., "Basle Accord vs. Value-at-risk Regulation in Banking", Aug. 23, 2000, 37 pages.

Coronado, "Comparing Different Methods for Estimating Value-at-Risk (VaR) for Actual Non-Linear Portfolios: Empirical Evidence", European Journal of Finance, Draft: Aug. 2000, pp. 1-28.

Pritsker, "Evaluating Value at Risk Methodologies: Accuracy versus Computational Time", Wharton Financial Institutions Center, Nov. 1996, 80 pages.

International Search Report dated May 8, 2003 from corresponding International Application No. PCT/US02/18606.

Global Investor Bookshop, "Search Results, Category Risk Management", Downloaded from http://books.global-investor.com/pages/search.htm?ginPtrCode=00000&CatCode=RIS, on Dec. 4, 2001, 21 pages.

Global Investor Bookshop, "Search Results, Category Derivatives", Downloaded from http://books.global-investor.com/pages/search.htm?CatCode=DER&PageFrom=0, on Dec. 4, 2001, 22 pages.

Techbooks Internet Bookshop, "Risk Management", Downloaded from http://www.technicalbookshop.com/finance/risk-man.htm, on Dec. 29, 2001, 7 pages.

WorldSciNet, "International Journal of Theoretical and Applied Finance, Contents", vol. 4, No. 1, Feb. 2001, Downloaded from http://www.worldscinet.com/ijtaf/04/0401/S0219024901040l.html, 1 page.

Dr. Robert T. Taigler, "Future and Options Bibliography", The Journal of Futures Markets, Downloaded from http://www.fiu.edu/~daiglerr/bib.htm, on Dec. 17, 2002, 33 pages.

* cited by examiner

Figure 14

| | |
|---|---|
| Create New Order – Microsoft Internet Explorer | |
| Deal Terms: | |
| Product: | US Corn |
| Structure: | Minimum Price Average |
| Underlying: | Select ▼ |
| Averaging Start Date: | Day ▼ Month ▼ Year ▼ |
| Averaging End Date: | Day ▼ Month ▼ Year ▼ |
| Minimum: | _____ (cents/uom) |
| Settlement Date: | Day ▼ Month ▼ Year ▼ |

| Bid: | | Offer: | |
|---|---|---|---|
| Quantity: | Price: | Quantity: | Price: |
| _____ | _____ | _____ | _____ |
| All or None: ☐ | | All or None: ☐ | |

| Bid Cancelation Terms: | Offer Cancelation Terms: |
|---|---|
| Order Cancels Order: | Order Cancels Order: |
| None ▲ / 123451 / 123452 ▼ | None ▲ / 123451 / 123452 ▼ |
| Underlying Price Contingency: | Underlying Price Contingency: |
| < ▼ _____ | < ▼ _____ |
| Good Until Canceled: ☐ | Good Until Canceled: ☐ |

[ Abort ] [ Post ]

Labels: 70, 71, 72, 73, 74, 75, 76, 77, 78, 79

Figure 15

Portfolio Position Risk - Microsoft Internet Explorer

Single Deal Constraints

|  | Limit | Proposed Deal |
|---|---|---|
| Notional Quantity | 1,000 | 200 |
| Total Quantity | 6,000 | 600 |
| Position Risk | 5,000,000 | 150,000 |

Trader Commodity Constraints

|  | Limit | Pre Deal | Post Deal |
|---|---|---|---|
| Single Month | 3,000 | 1,900 | 2,100 |
| All Months | 10,000 | 4,100 | 4,700 |
| Position Risk | 12,000,000 | 7,032,100 | 7,019,400 |

Trader Portfolio Constraints

|  | Limit | Pre Deal | Post Deal |
|---|---|---|---|
| Single Month | 5,000 | 2,700 | 2,900 |
| All Months | 10,000 | 6,200 | 6,800 |
| Position Risk | 12,000,000 | 11,444,500 | 10,688,700 |
| Remaining Headroom = |  | 555,500 | 1,311,300 |

Participant Margin & Exposure Consumption

Collateral Deposit = 1,000,000
Exposure Limit = 100,000,000

|  | Pre Deal | Post Deal |
|---|---|---|
| Portfolio Value | (114,230) | (108,750) |
| Total Position Risk Limit | 100,885,770 | 100,891,250 |
| Minimum Margin Requirement | 57,222,500 | 56,466,700 |
| Remaining Headroom | 43,663,270 | 44,424,550 |
| Total Margin Equity | 885,770 | 891,250 |
| Exposure Usage | 56,336,730 | 55,575,450 |
| Cash Available | 0 | 0 |

Close Window

INTEGRATED ELECTRONIC EXCHANGE OF STRUCTURED CONTRACTS WITH DYNAMIC RISK-BASED TRANSACTION PERMISSIONING

RELATED APPLICATIONS

This application claims priority under 35 USC 119(e), to the Provisional Application No. 60/297,484 entitled "Integrated Electronic Exchange of Structured Contracts (IEESC) and Dynamic Risk-Based Transaction Permissioning," which was filed on Jun. 11, 2001 and Provisional Application No. 60/300,584 entitled "Integrated Electronic Exchange Of Structured Contracts (IEESC) and Dynamic Risk-Based Transaction Permissioning," which was filed on Jun. 22, 2001, where these provisional applications are hereby incorporated by reference.

FIELD OF THE INVENTION

The invention relates to the structuring, negotiation, pricing, execution, clearing, and settlement of contracts involving two or more counter parties and one or more rights and/or obligations.

COPYRIGHT NOTICE

A portion of the disclosure of this patent document contains material, which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

Contracting processes fall into two general types: 1) contracting processes are provided by a third party separate from the counterparties or 2) contracting processes are provided by counterparties directly to each other. The first case is often seen in exchanges that provide standardized contracts and processes, and often full novation, to the parties of a contract. The second case is most usually seen in direct bilateral contracting (e.g. in the over-the-counter market), and in contract exchanges that provide negotiation facilities, but not contract assurance. In the second case, insurance companies have designed insurance contracts that provide a partial measure of protection against the failure of a party to perform its obligations.

An exchange is a facility engaged in the business of facilitating the structuring, negotiation, execution, clearing, and settlement of contracts among it members. An exchange may be composed of one or more markets that segment contract categories, products, and members. Examples of exchanges include, but are not limited to, futures and options contract markets, electronic exchanges, automated procurement systems, automated order taking systems, structured contract marketing systems, and structured contract trading systems. A contract market is composed of the participants, facilities and rules by which offers and counteroffers can be made to structure, negotiate, execute, clear, and settle contracts. The over-the-counter market is a loosely interconnected plurality of exchanges, contract markets and participants. A member of an exchange is a legal entity authorized by an exchange to utilize its facilities to structure, negotiate, execute, clear, and settle contracts. A participant is any user, member or other entity authorized to use any facility of the exchange or its markets. Exchange rules are the terms and conditions required of members. Exchange rules may be specified and agreed by contract-between and among an exchange and its members, may be enforced by authorization procedures, and may be subject to government regulation. "Clear" means to provide assurance of contract performance to all counterparties to a contract that the terms of the contract will be performed, or that the money value of the contract will be paid in lieu of performance. "Execute" means to make an accepted offer enforceable on each counterparty that has agreed to the contract according to the exchange rules. "Settle" means to perform the obligations of each counterparty that is party to a contract, which may require financial transfers or physical product delivery. A central challenge of contracting has historically been assuring that the terms of executed contracts are performed. A method widely applied to assure performance has been the assignment of collateral to back the financial obligations of the counterparties. Collateral can be in the form of cash, securities, guarantees, contract portfolios, or letters of credit provided by a member to secure its contractual commitments. In some exchanges this collateral is called "margin", and rules on net capital of exchange members provide further collateral. In bilateral contracting, collateral may take the form of net capital, a guarantee, an insurance contract, or pledged assets. In either case, the magnitude of collateral required might vary over time due to changing values of the contract, changing market conditions, the changing financial condition of the counterparties, and the progress of time toward expiration of the contracts. It has become common to use measures of financial risk to judge the appropriate magnitude of collateral. For example, margin levels in organized exchanges are often set based on historical or forecasted financial risk analyses.

Increasingly, the concept of value at risk (VaR) has been used to provide a consistent framework within which to measure financial risk of a contract as it changes over time, and to set collateral requirements based on a consistent confidence level. Value at risk is a quantitative measure of the amount by which the value of a portfolio of contracts may change over a specified time horizon at a specified confidence level, or quantitative index indicating likelihood. The computation of value at risk is described in multiple references and books in the literature. Three general categories of algorithms are described: historical, parametric, and simulation. Historical methods utilize a historically representative data set to project how a contract would have changed in value during that period of time. Parametric methods utilize analytically tractable formulas to represent the probability distribution for potential changes in a contract's value, and the parameters are then estimated using historical data and judgment. Simulation methods represent the time evolution of risk factors and contingent decisions over time, and combine the results. Risk factors may be market prices, default potential, external events, or other uncertainty. Scenarios can be created by random, pseudo-random, lattice, decision tree, or other methods. Probability distributions for the time evolution of the risk factors may be continuous or discrete, jointly dependent, and/or stochastic processes. The results may be combined by a simple average method, by weighting methods, or by other methods that aggregate scenarios. Each method has advantages. Historical methods enable representative past events to be used as a stress test for extreme changes in a contract's value. Parametric methods enable fast computation of contract value and value at risk for large portfolios, because the parametric methods are usually chosen for their analytic tractability. Simulation methods are generally more accurate than parametric, since no constraint on the nature of the underlying distribution of price changes or creditworthiness is required. Each method also has disadvantages. Historical methods are limited to the events that actually occurred in the past, rather than events that could occur. Parametric methods generally lose accuracy due to the assumptions imposed to produce tractable formulas. These assumptions may include the nature of the stochastic price process, the parametric form of the probability distribution of price changes, the parametric form of the probability distribution on volatility, the nature of optimal exercise of American options, the method of calculating indexes, and similar features of contracts that involve both rights and obligations. Simulation methods are time consuming to finish the computations, and with large multi-factor portfolios, the number of scenarios required can be very large to achieve a desired level of accuracy.

Recent literature has sought to more consistently apply value at risk to exchange trading. Indeed, the methods used by some exchanges to set contract margin levels can be viewed as being similar to applying value at risk methods. And, when used in procurement and marketing, VaR is a useful technique for measuring the credit risk posed by a prospective counterparty. A challenge in implementing value at risk as a measure of financial exposure when transactions are time critical is that the accurate computation of VaR is time intensive. While many approximations are available, permitting faster execution, their accuracy may be less than adequate.

To avoid risk-based computations during time-critical contracting, present approaches usually rely on a contract specific collateral, guarantee, or margin. Despite the potential that margins can be changed periodically, these methods do not enable an exchange to maintain a constant target level of financial risk since both price risk and counterparty default risks are continuously changing. A typical exchange margin system operates on a contract-specific basis, with potential cross-contract credits. These typical systems also do not enable full risk-based netting. "Netting" refers to an offset of one contract or risk against an equivalent and opposite contract element or risk. Similar observations apply to contract guarantees, letters of credit, and insurance contracts when they are used to assure contract performance.

SUMMARY OF THE INVENTION

In one embodiment of the invention, a computer implemented method for negotiating contracts between a plurality of participants is provided. An order is received from a first participant of the plurality of participants. Position risk of the first participant is calculated by accessing data regarding the first participant and using the data regarding the first participant in a parametric variable equation modified by control values from a simulation model, to calculate the position risk of the first member. The order is blocked, if the position risk of the first participant is in a first condition for the first participant. The order is made available for forming into a contract, if the position risk of the first participant is in a second condition for the first participant.

In another embodiment of the invention, a computer implemented method of estimating value at risk for a participant is provided. A parametric variable equation is generated from provided data. A simulation model is generated from the provided data. Control values are generated from the simulation model. An estimated value at risk equation is generated from the parametric variable equation modified by the control values.

In another embodiment of the invention, a computer system for providing an exchange for forming contracts between a plurality of users is provided. A transaction system connected to a plurality of client applications over a network, comprising an order management system for managing orders received from the plurality of users, an order matching system for comparing orders received from the plurality of users to find matching orders, and a contract execution system for combining matched orders to form a legally binding contract is provided. A permissioning system, comprising a collateral system for monitoring collateral of the plurality of users and a real-time position risk system for calculating a position risk of a user to determine, where the real time position risk system uses the calculated position risk to designate an order to be a permitted order and where the contract execution system only combines permitted orders into a legally binding contract is provided.

In another embodiment of the invention, a computer readable media for negotiating contracts between a plurality of participants is provided. Computer readable code for receiving an order from a first participant of the plurality of participants is provided. Computer readable code for calculating position risk of the first participant, comprising computer readable code for accessing data regarding the first participant and computer readable code for using the data regarding the first participant in a parametric variable equation modified by control values from a simulation model, to calculate the position risk of the first member is provided. Computer readable code for blocking the order, if the position risk of the first participant is in a first condition for the first participant is provided. Computer readable code for making the order available for forming into a contract, if the position risk of the first participant is in a second condition for the first participant is provided.

In another embodiment of the invention, a computer implemented method for providing assurance of contract performance for contracts previously agreed among two or more counterparties is provided. A transaction system connected to a plurality of client applications over a network comprising an order management system for managing orders for assurance contracts on previously executed contracts is provided. A permissioning system, comprising a collateral system for monitoring collateral of the plurality of users and a real-time position risk system for calculating a position risk of the counterparties, where the real time position risk system uses the calculated position risk to designate a contract to be a cleared contract is provided.

BRIEF DESCRIPTIONS OF THE FIGURES

The present invention is illustrated by way of example, and not by way of limitation, in the figures of the accompanying drawings and in which like reference numerals refer to similar elements and in which:

FIG. 1 provides a high-level schematic view of a system used in an embodiment of the invention.

FIG. 2 provides a high-level flow chart of a process used by the system shown in FIG. 1.

FIG. 3 provides a schematic view of subsystems of a client application.

FIG. 4 provides a schematic view of subsystems of a risk-based permissioning system.

FIG. 5 provides a schematic view of subsystems of a transaction system.

FIG. 6 provides a schematic view of an interaction of multiple exchanges.

FIG. 7 provides a flow chart of a process used by the risk-based permissioning system shown in FIG. 4.

FIG. 8 provides a schematic showing additional details of the interaction between a real-time position risk system and a position risk supervision system.

FIG. 9 provides a flow chart of a process used in an embodiment of the real-time position risk system.

FIGS. 14-17 illustrate several of the plurality of templates that are used to display information to a user and receive instructions from the user.

DETAILED DESCRIPTIONS OF THE FIGURES

Figure 1:
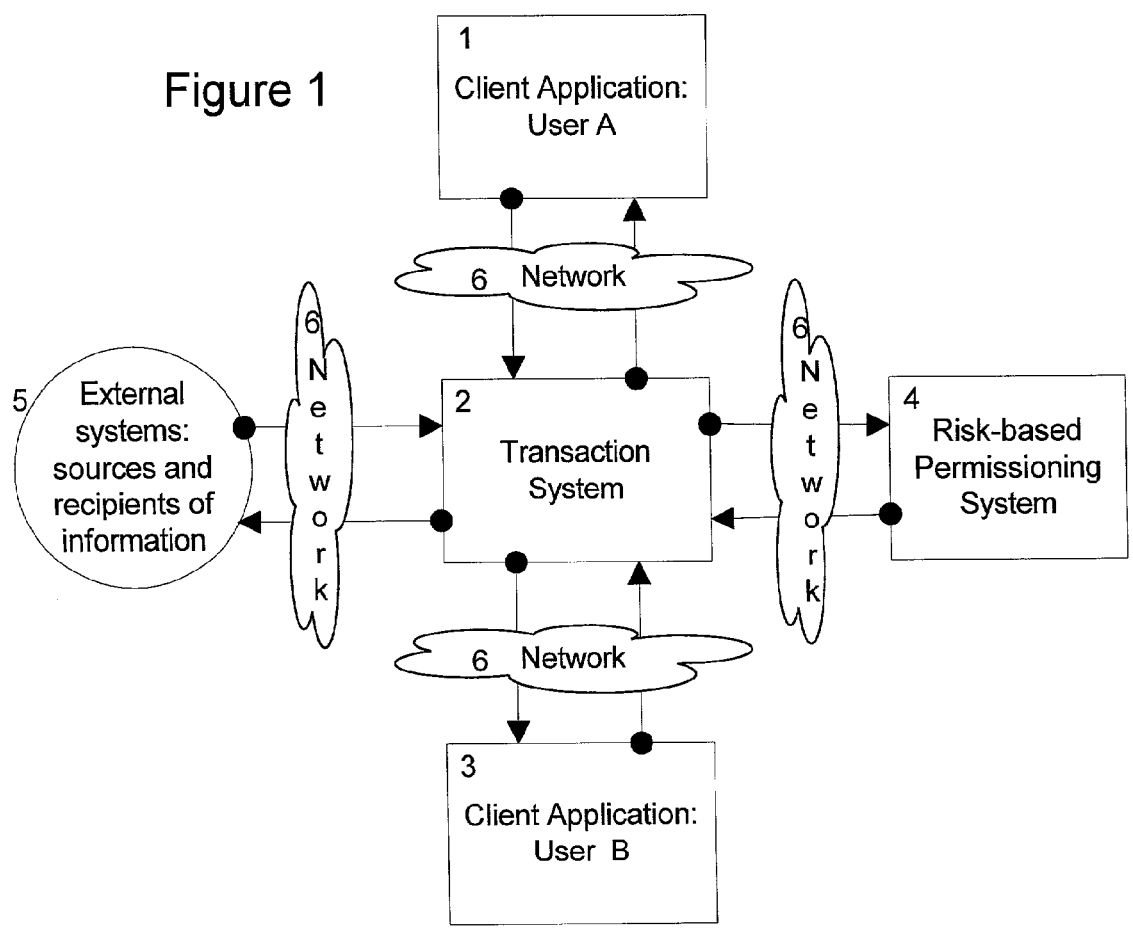

The present invention will now be described in detail with reference to a few preferred embodiments thereof and as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention discloses a novel method of providing contract assurance through the use of dynamic risk-based transaction permissioning. Assurance is provided by continuously measuring value at risk for a member and its traders, and permitting a proposed transaction to advance toward execution only if that member and its trader have sufficient available collateral. A trader is an individual authorized by a member to make contract commitments.

The present invention discloses a novel method of enabling this principle to be applied continuously and at a pace typically sustained by computer automation to enable time-critical contracting. The present invention discloses a novel method of permissioning contracts that enables real-time use of value at risk in an exchange to permission contract offers (e.g. a buy or sell order) prior to contract execution. Permission is an act to allow an order to be posted or displayed to other users, or to allow a transaction to be executed, or to allow a contract offer to proceed to the next step of transaction processing. The present invention also presents a novel method of maintaining the level of financial risk for a trader or member at a constant level. The present invention enables the exchange to set a predetermined confidence level, and the collateral requirements of a given portfolio can then be adjusted in accordance with changing market conditions.

The present invention also presents a novel method of netting risk or value at risk, as well as the more traditional use of netting identical standardized contracts. Netting risk is particularly important for structured contracts, which are contracts assembled from one or more contract elements.

The evolution of multi-parametric electronic exchange technology enables the electronic creation and negotiation of complex structured derivative contracts. These contracts require a multi-parameter framework because the needs of buyers and sellers of complex derivative contracts cannot all be reduced to standardized contracts that can be traded with single parameter pricing. These new electronic exchange technologies allow the tracking of multiple parallel negotiation threads among a group of traders. Various versions enable highly complex business exchange processes to be automated, including structured derivatives and long-term contracts. Various versions also enable multilateral contracts, among more than two counterparties.

The use of the term "electronic" indicates that processes are computer automated and operate at a speed enabled by computer systems and communication systems using electromagnetic and/or optical technology. Electronic technologies include wireless and fiber optic technologies.

To facilitate understanding, FIG. 1 provides a schematic view of a system used in an embodiment of the invention. The diagram shows a simple exchange with a first user A of the plurality of users using a first Client Application 1 and a second user B of the plurality of users using a second Client Application 3 connected through a network 6 to a transaction system 2, which is connected through a network 6 to a risk-based transaction permissioning system 4 and to external systems that are sources and recipients of information 5. A user can be a member or a trader, or their authorized representative, who is authorized to place orders and issue instructions. The primary purpose of the first and second Client Applications 1, 3 is to provide an interface to users who may want to structure, negotiate, execute, and settle contracts with other users. The Client Application contains subsystems that receive information from the transaction system 2, display information to the user, receive information from the user, and transmit information to the transaction system 2. The primary purpose of the transaction system 2 is to manage the flow of information among users, to and from the risk-based transaction permissioning system 4, and to and from external systems 5. The transaction system 2 contains subsystems that receive, validate, store, process, and transmit information among other subsystems. The primary purpose of the risk-based permissioning system 4 is to receive information from the transaction system 2, produce a decision permitting or denying authorization for a proposed contract, and to transmit that decision back to the transaction system 2. The risk-based permissioning system 4 contains subsystems that receive, validate, store, process, and transmit information.

Figure 2:
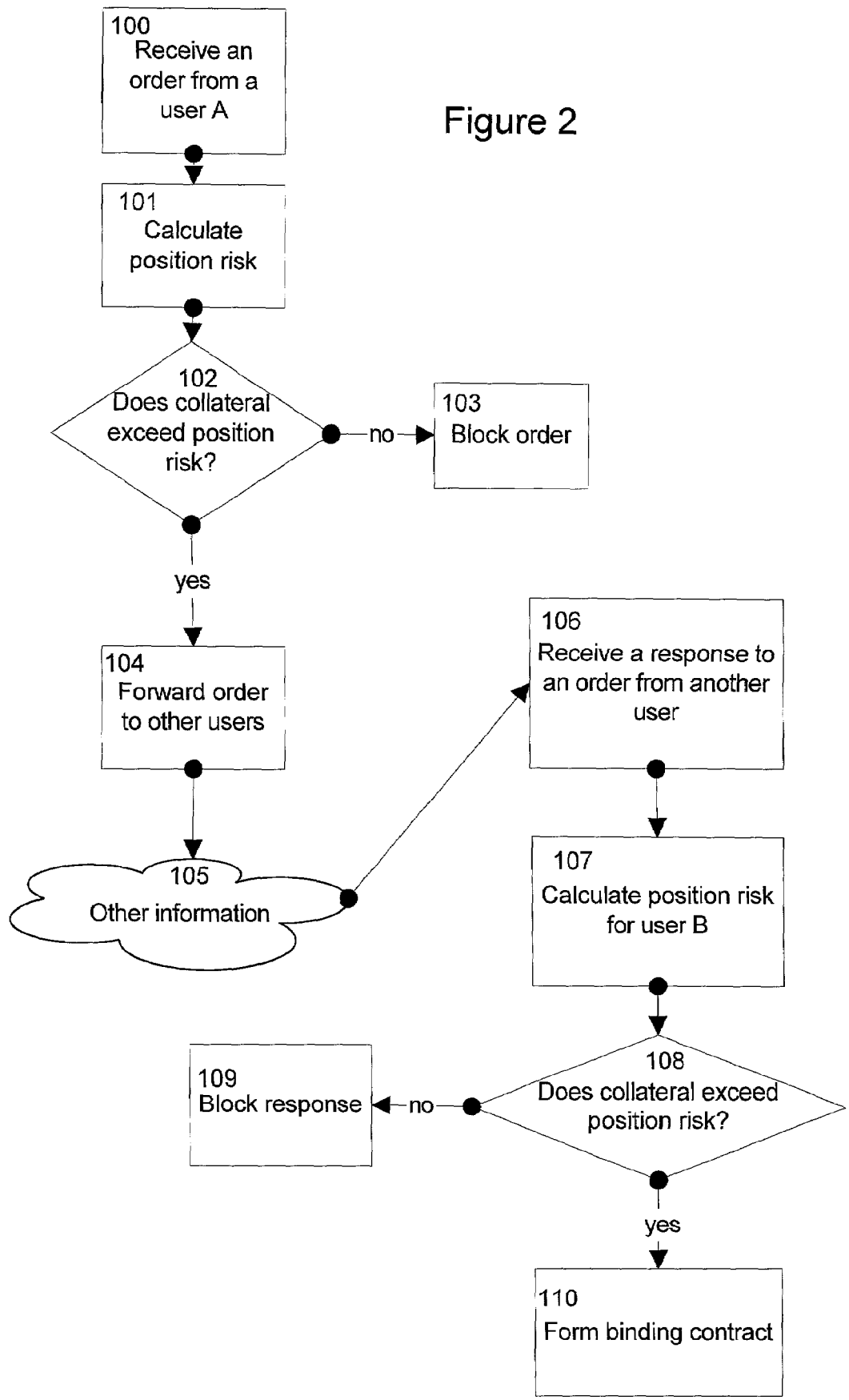

FIG. 2 is a schematic high-level flow chart of a process used by the system shown in FIG. 1. An order is received from the first user A (step 100). An order is a proposed contract specifying a structured contract desired to be executed by a member. An order may be partially specified, conditional on future events, contingent on the passage of time, or revocable prior to execution. The position risk of the user A is calculated (step 101). Position risk is a quantitative measure of the financial risk of a portfolio of contracts taking into account the member's value at risk, the member's credit rating, and other relevant information about the member and the market value of executed and proposed contracts. A comparison is made between the position risk of user A and its available collateral (step 102). If the comparison results in a first condition the order is blocked (step 103), and if the comparison results in a second condition the order is permitted. A condition can be any logical or mathematical result. For example, if the position risk exceeds the available collateral, the order is blocked (step 103), so that the order is not available for forming a contract. If the position risk is less than the available collateral, the order is made available for forming a contract, which in this embodiment means that the order is forwarded to one or more of the plurality of users (step 104). Other information and orders may be combined and forwarded to some or all of the plurality of users (step 105). An order is received from a second user, which in this embodiment means that a response is received from a second user B to the user (step 106). In another embodiment the order from the second user may be an order that is matched with the order from the first user. The position risk of the second user B is calculated (step 107). A comparison is made between the position risk of user B and its available collateral (step 108). If the comparison results in a first condition the order is blocked (step 109), and if the comparison results in a second condition the order is permitted. For example, if the position risk exceeds the available collateral, the order is blocked (step 109), so that this order is not available for forming a contract. If the position risk is less than the available collateral, the order is available for forming a contract and the orders from the first and second participants may be formed into a binding contract (step 110).

Figure 3:
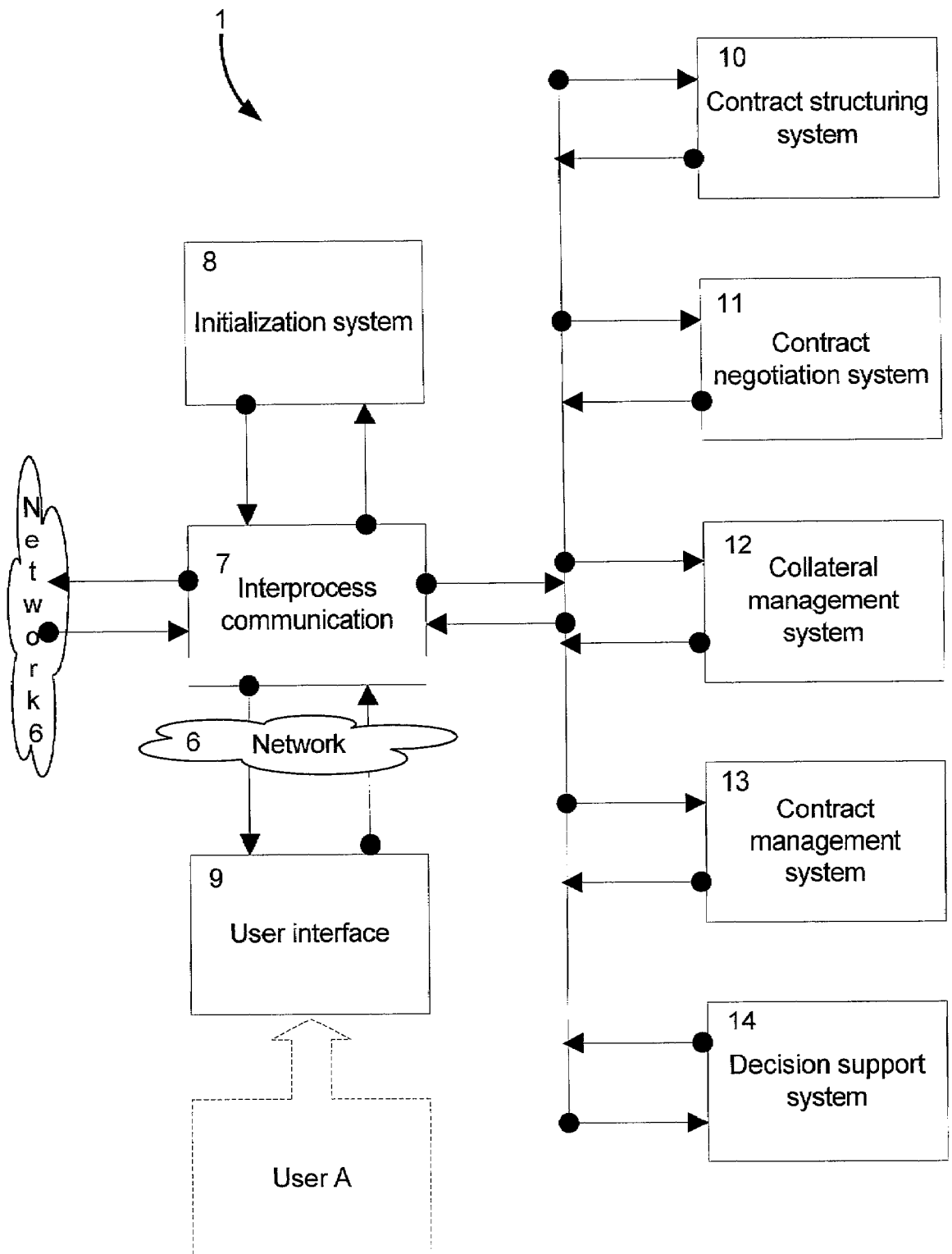

FIG. 3 provides a schematic view of the subsystems of the client application 1 used in an embodiment of the invention. The diagram shows the subsystems used by one of the plurality of users. The interprocess communication system 7 facilitates the connection of the user A through the user interface 9 to the network 6, the initialization system 8, the contract structuring system 10, the contract negotiation system 11, the collateral management system 12, the contract management system 13, and the decision support system 14. The primary purpose of the interprocess communications system 7 is to establish, authenticate, and maintain communications among the sub systems and the network. The primary purposes of the user interface system 9 are to enable the user A to receive information about contracts, collateral, and risk; and to issue instructions to structure, negotiate, and settle contracts. The primary purpose of the initialization system 8 is to receive initial data and perform initial processing of the data when the client application system 1 is first invoked by the user A. The primary purpose of the contract structuring system 10 is to facilitate the user A in structuring a proposed new contract from contract elements. A contract element is the smallest allowed component of a structured contract, and may be an option or a commitment to deliver or receive money or a physical product at a specified location and time (or period of time). A single contract element may by itself form a structured contract. An option is the right, but not the obligation, of one member to require fulfillment of a contract obligation by another member. A physical product is generally defined by a list of attributes including, but not limited to, minimum quantity and prescribed quality. The primary purpose of the contract negotiation system 11 is to facilitate the user A in responding to contract offers from other users. The primary purpose of the collateral management system 12 is to facilitate the user A in depositing, valuing, and allocating collateral. The primary purpose of the contract management system 13 is to facilitate the user A in identifying, categorizing, viewing executed contracts, and viewing current valuation and position risk. The primary purpose of the decision support system 14 is to facilitate the user A in viewing potential future changes in valuation and position risk and in making decisions regarding contracts, collateral, and position risk.

Figure 4:
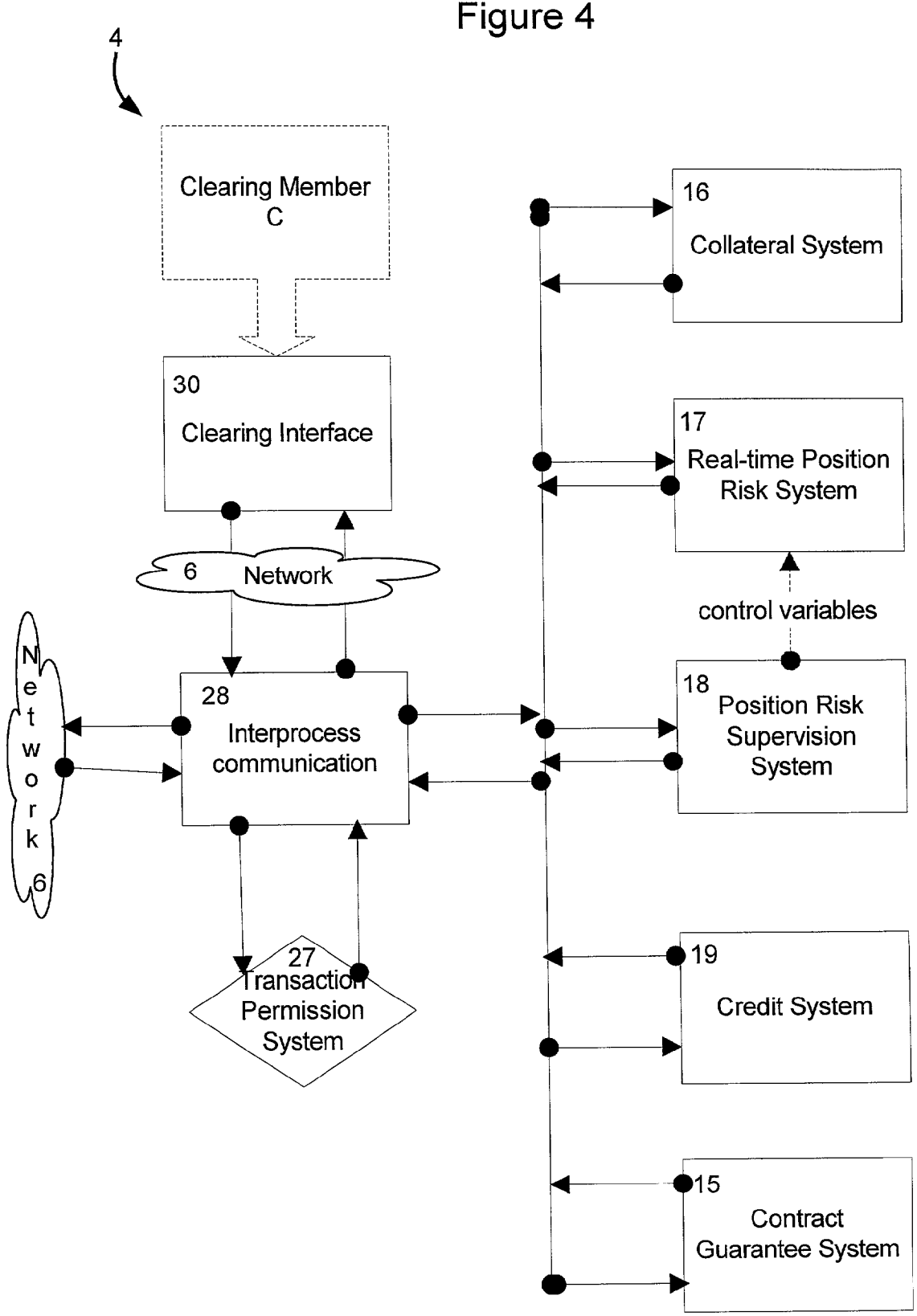

FIG. 4 provides a schematic view of the subsystems of the risk-based permissioning system 4 used in an embodiment of the invention. The diagram shows the subsystems invoked by the transaction system 2 and used by one of the plurality of clearing members C who are authorized to set risk parameters of the risk-based permissioning system 4. Clearing members are members that are authorized to guarantee performance of contracts that have been permissioned. The interprocess communication system 7 facilitates the connection of the clearing member C with the clearing interface 30 through the network 6 to the transaction permission system 27, the contract guarantee system 15, the collateral system 16, the real-time position risk system 17, the position risk supervision system 18, and the credit system 19. The primary purpose of the transaction permission system 27 is to compare the position risk of a user against the collateral available to that user, and make a decision to permit or deny a proposed contract offer. The primary purpose of the clearing interface 30 is to enable a clearing member C to receive information about permitted contracts and submit instructions to the transaction permissioning system 27. The instructions include settings for the risk parameters. The primary purpose of the contract guarantee system 15 is to facilitate the provision of guarantees against financial loss in the event of a contract default. The primary purpose of the collateral system 16 is to receive, value, and monitor collateral of users. The primary purpose of the real-time position risk system 17 is to compute the position risk for the user proposing a contract within a specified minimum time. The real-time position risk system 17 utilizes approximation formulas for position risk with control variables received from the position risk supervision system 18 and parameters set by a clearing member C. The primary purpose of the position risk supervision system 18 is to compute the position risk for users within a specified level of accuracy. The position risk supervision system 18 chooses the level of some of the plurality of control variables that improves the accuracy of the real-time position risk system 17. The primary purpose of the credit system 19 is to provide an estimate of the default probability for a user.

Figure 5:
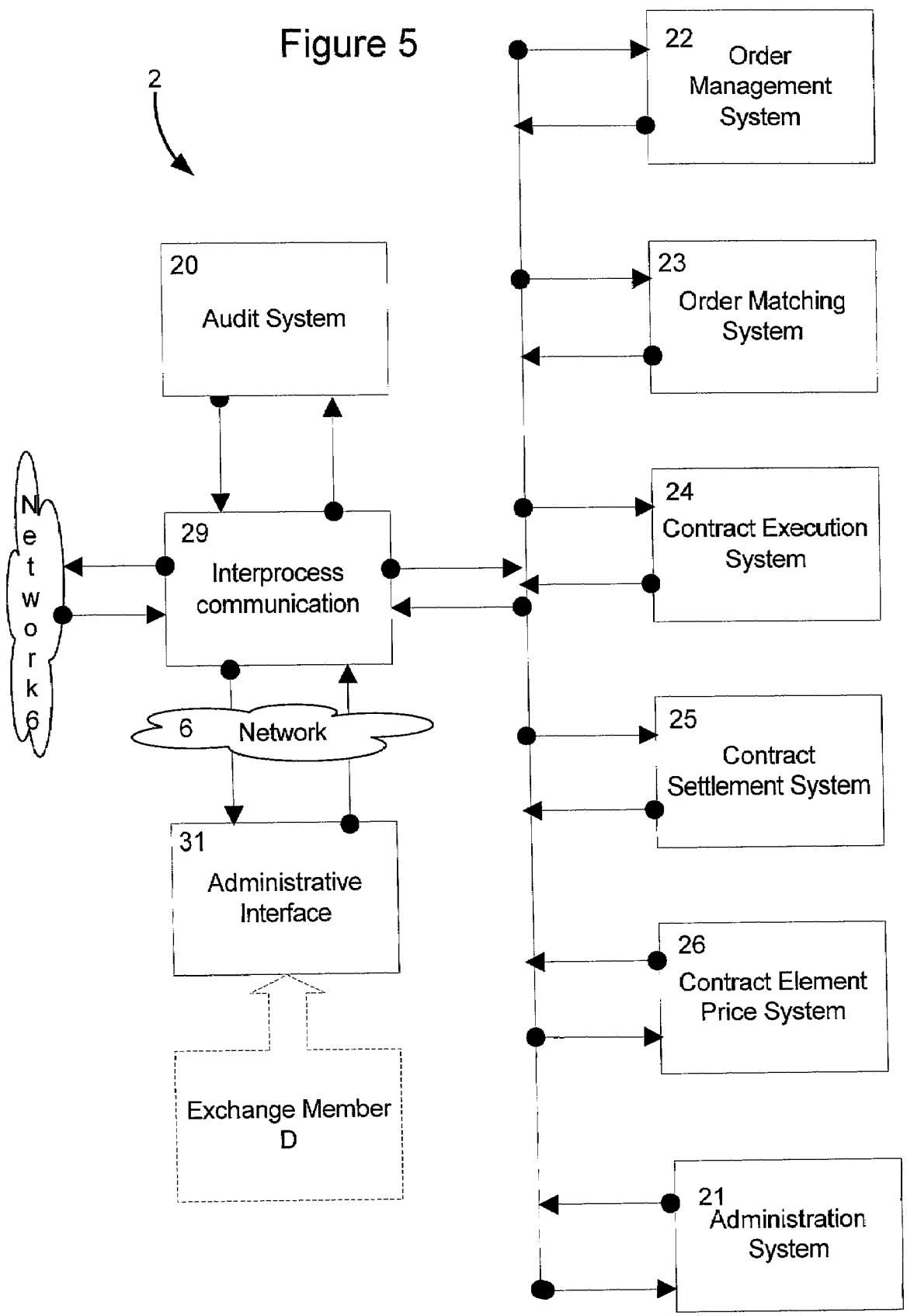

FIG. 5 provides a schematic view of the subsystems of the transaction system 2 used in an embodiment of the invention. The diagram shows the subsystems used by one of the plurality of authorized exchanges. The interprocess communication system 29 facilitates the connection of an exchange member D with the administrative interface 31 through the network 6 to the audit system 20, the administration system 21, the order management system 22, the order matching system 23, the contract execution system 24, the contract settlement system 25, and the contract element price system 26. The primary purpose of the audit system 20 is to log interprocess communications for validation, auditing, and supervision. The primary purposes of the administration system 21 are to enable the exchange member D to create and maintain contract market structures, create and maintain user account structures, issue pay-and-collect instructions, compute fees and submit invoices, and create and maintain reporting structures. An exchange member is a member that is authorized to modify or create user accounts, modify or create markets, modify and create smart templates, and modify or create contract elements. The primary purposes of the order management system 22 are to receive, store, and process contract orders from users. The processing may include storing orders in various queues depending on their source, priority, order type, and permission status. The order management system 22 communicates through the interprocess communications system 29 with the risk-based permissioning system to receive a decision to permit or deny a proposed contract. The primary purpose of the order matching system 23 is to compare a contract order against a list of previously approved contracts to identify exact, partial, or near matches. A match occurs when an offer and an acceptance or a buy order and a sell order have been identified that can form a structured contract according to the rules of the exchange. The primary purpose of the contract execution system 24 is to combine a valid permitted offer with a valid permitted acceptance to form a legally binding contract. The primary purposes of the contract settlement system 25 are to monitor executed contracts and receive and issue settlement instructions. The primary purposes of the contract element price system 26 are to create and maintain historical and current prices for contract elements.

Figure 6:
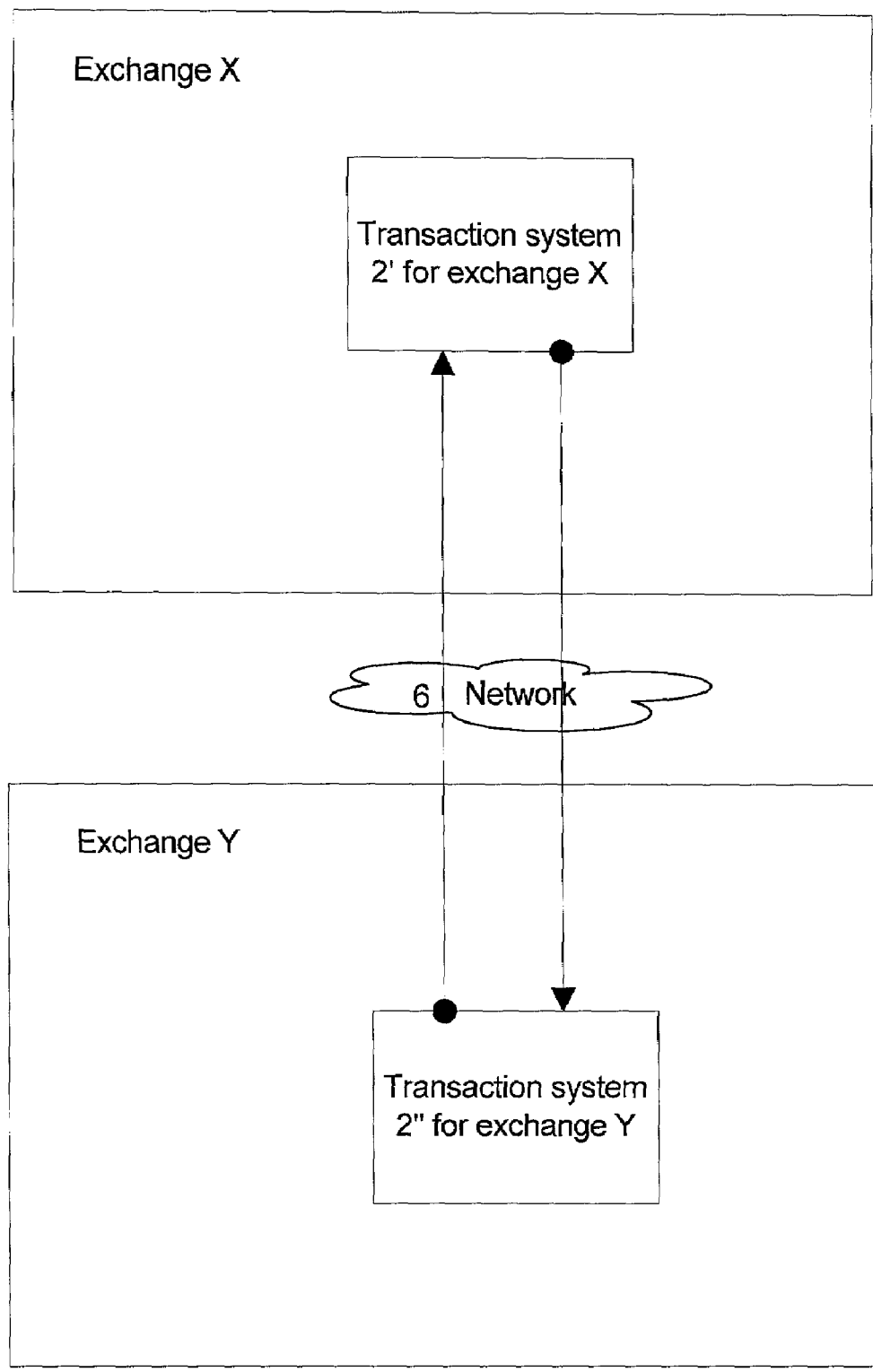

FIG. 6 is a high-level schematic illustrating the interaction of two of the plurality of exchanges. Orders that are created and permissioned in exchange X may be transmitted to exchange Y for display to some or all of the plurality of users accessing that exchange. Orders that are created and permissioned in exchange Y may be transmitted to exchange X. Responses may likewise be created, permissioned and transmitted among the plurality of exchanges for display to some or all of the plurality of users.

Figure 7:
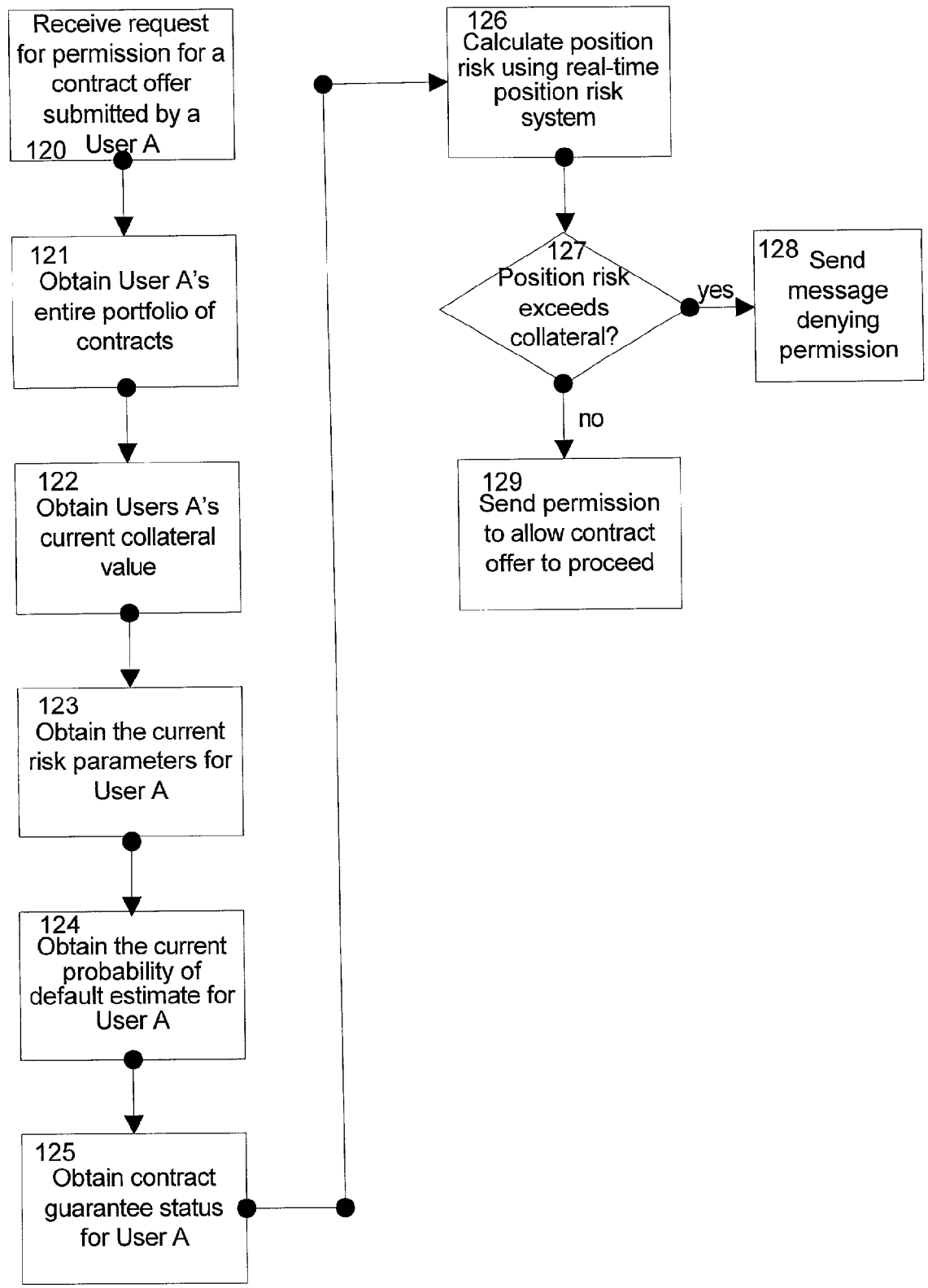

FIG. 7 is a schematic flow chart of a process used by the system shown in FIG. 4 and is a more detailed flow chart of steps 101-103 illustrated in FIG. 2. A message is received from the transaction system 2 requesting permission for an order (step 120). A list of all current contracts involving User A is obtained (step 121). The current value of all collateral available to User A is obtained (step 122). The current risk parameters applicable to User A are obtained (step 123). The current default probability estimate for User A is obtained (step 124). The status of contract guarantees for User A is obtained (step 125). Position risk is calculated using the real-time position risk system 17 (step 126). The transaction permission system 27 compares position risk to collateral (step 127). If position risk exceeds collateral, then a message is sent to the transaction system 2 denying permission for the order (step 128). If collateral equals or exceeds position risk, a message is sent to the transaction system 2 allowing the contract offer to proceed (step 129).

Figure 8:
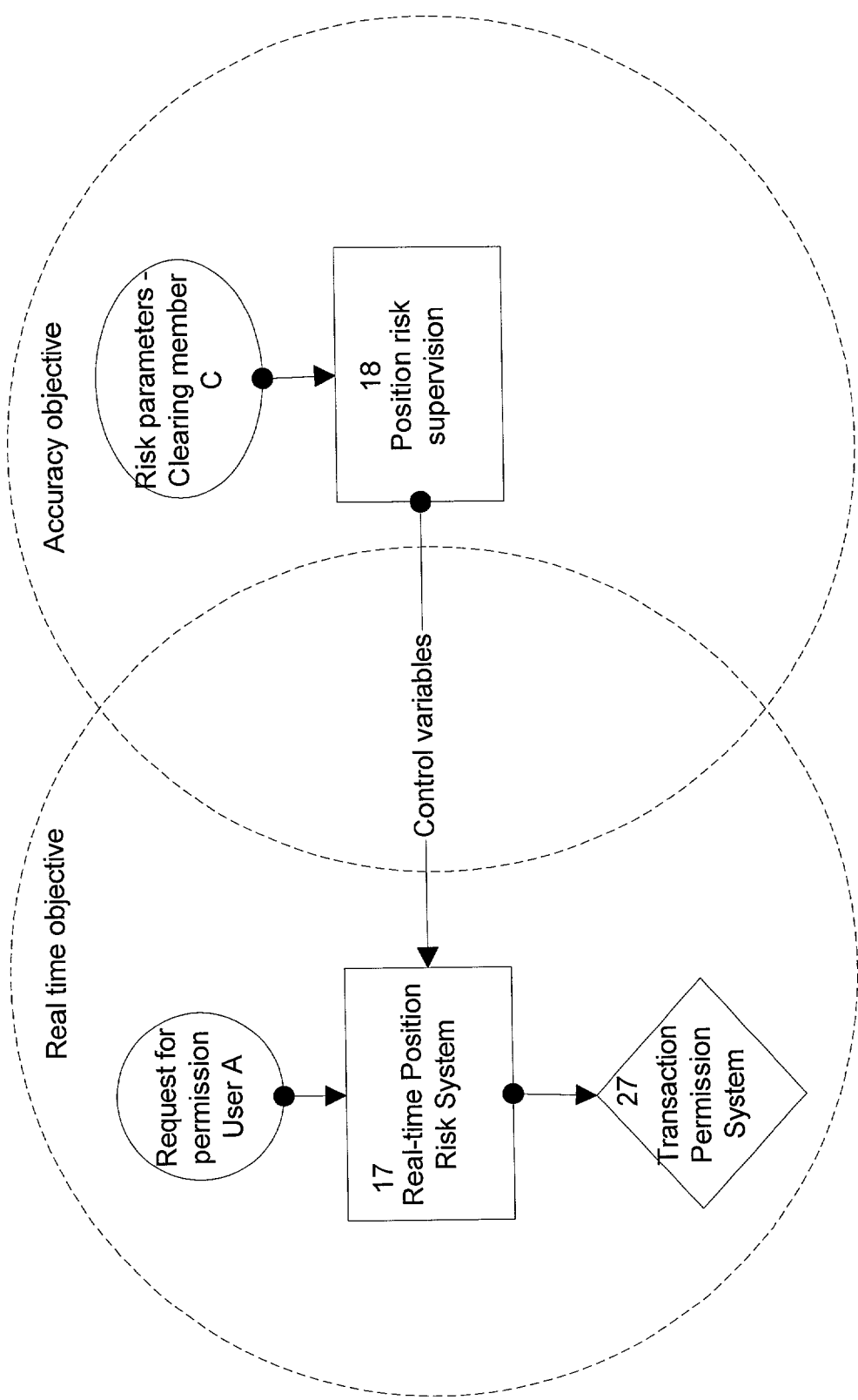

FIG. 8 is a high level schematic showing additional details of the interaction between the real-time position risk system 17 and the position risk supervision system 18. The real-time position risk system 17 is intended to operate in a fully automated mode. Quantitative formulas are used by the real-time position risk system 17 that enable it to calculate an estimate of the position risk for a user A submitting a contract order within a specified level of time. Control variables are used to modify standard formulas for parametric value at risk so a more accurate estimate position risk is obtained. Control variables may be specific to individual users, specific to individual contract specifications, or specific to market conditions. Control variables are intended to be modified periodically, but not necessarily in real time, by the position risk supervision system 18. Clearing member C sets parameters for the position risk supervision system 18, which enables clearing member C to adjust the confidence level, the time horizon, the risk mapping arrays, and other variables. The position risk supervision system 18 is intended to compute the position risk for user A to a specified degree of accuracy. The time required for such a calculation may not permit real-time responsiveness. The position risk supervision system 18 computes control variable settings that have the effect of adjusting the value-at-risk formulas so as to achieve a higher level of accuracy.

Figure 9:
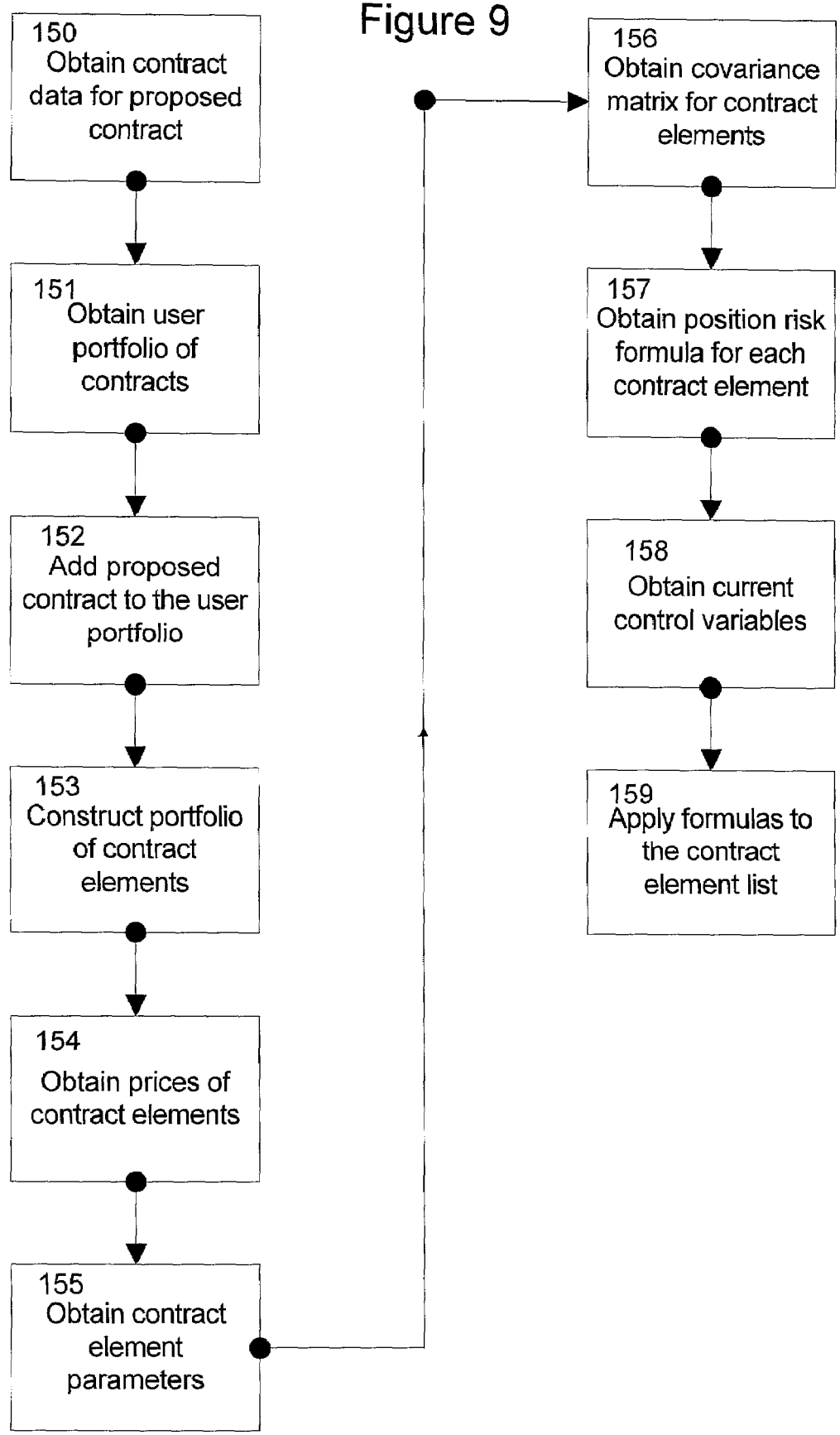

FIG. 9 provides a schematic of a process used in an embodiment of the real-time position risk system 17 to calculate position risk of a user A for a proposed contract. The contract data specifying contract elements for the instant contract offer are obtained (step 150). The portfolio of user contracts currently in force is obtained (step 151). The proposed contract is added to the existing user portfolio (step 152). A list of all contract elements is constructed from the union of user A's portfolio and the proposed contract (step 153). The current prices for each contract element are obtained (step 154). The contract element parameters are obtained (step 155). The current covariance matrix for the contract elements is obtained (step 156). The formula and algorithm applicable to each contract element is obtained (step 157). The current control variables are obtained (step 158). The formulas for each contract element are applied 158 using the contract element parameters, the covariance matrix, the contract element prices, and the current control variable setting (step 159).

Figure 10:
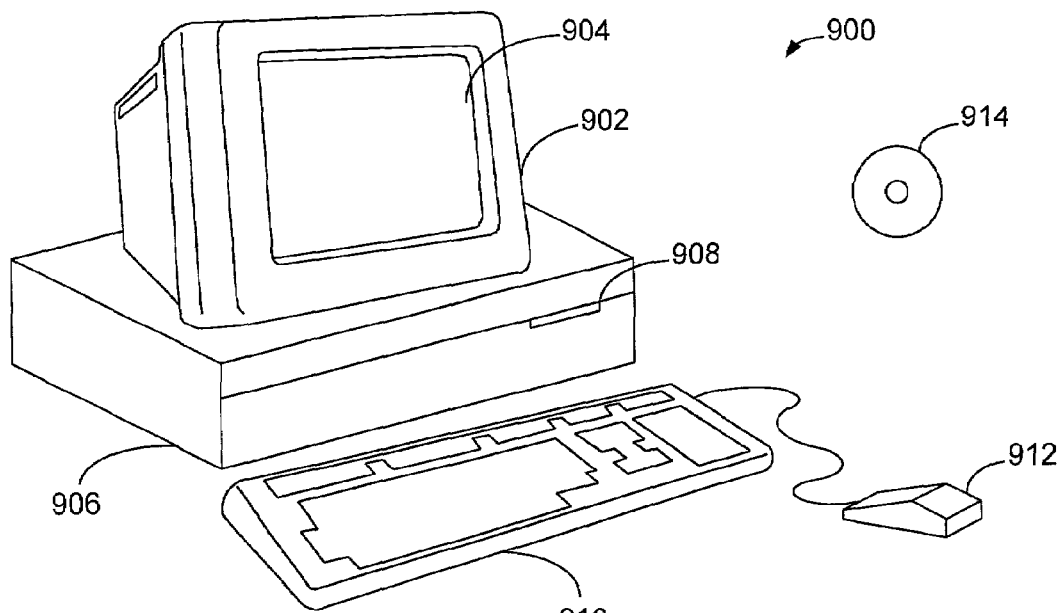
FIGS. 10 and 11 illustrate a computer system, which forms part of the network, and is suitable for implementing embodiments of the present invention.
Figure 11:
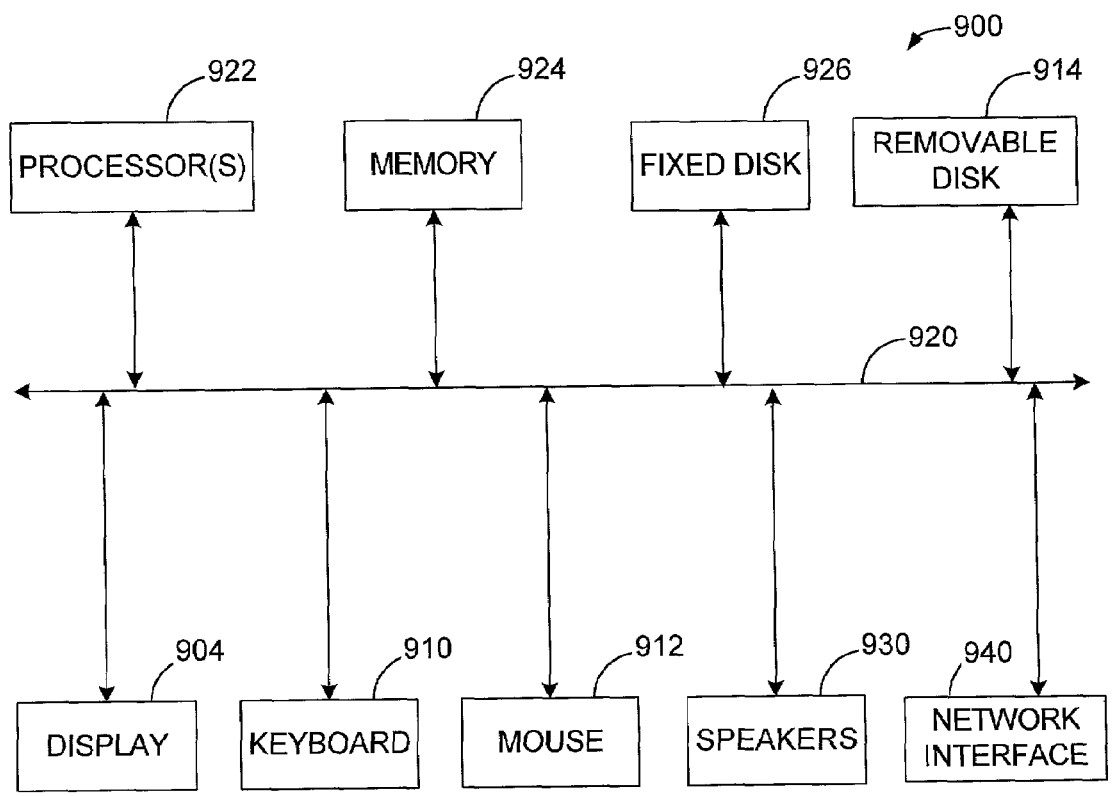

FIGS. 10 and 11 illustrate a computer system 900, which is suitable for implementing embodiments of the present invention. Each process or subsystem may be implemented on separate computer systems or combined together on a single computer system. FIG. 10 shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 11 is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912, and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing. It is generally understood that such telecommunication networks could use both electromagnetic and optical technologies for communicating messages.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

One embodiment of the invention is a transaction platform layered with a proprietary derivatives application, interprocess communication interfaces based in XML, proprietary analytic, monitoring and reporting systems built in Java, and seamlessly integrated into the transaction platform.

The transaction system has been designed to accommodate and replicate virtually any derivative contract structure that is commonly traded over-the-counter and divides them into two separate modules. The first embraces all vanilla structures that comprise the majority of OTC customized derivative transactions and includes: Forwards, Call/put options, Caps and floors, Swaps, Swaptions, Strips of puts, Calls or collars, and Spreads. The second is a suite of products that caters to those traders active in highly unique, exotically structured products such as: Barrier options, Look-back options, Knock-in/knock-out option, and Average price or Asian options.

The trade engine supports multiple real-time private, open or anonymous, and simultaneous negotiations. The user can choose between several different conventional negotiation styles such as: Universal request for quote or RFQ facilities with negotiable attributes, two-way quotes, firm, non-firm, filtered to certain counter-parties; Auction style, both many-to-one and one-to-many; or Live bid-ask quotes or many-to-many open trade book style.

The structure definition interface employs "smart templates" that enable efficient entry of orders for pre-defined popular contract structures. Those structures can be derived from a standard instrument type or may be customized to meet requirements specific to certain markets. In addition, each template and each market has pre-defined business rules that guide the user toward typical market convention (units, period etc.). Recognizing the logical hierarchy between product attributes, the "smart template" guides the user through contract creation with a minimum of key strokes and a series of short pick lists.

The system also employs a variety of control mechanisms to provide security and integrity throughout the process. These controls include: Position risk controls or transaction limit constraints on both a corporate member and individual trader level; Internal trader controls limiting trade size, product type, instrument type, and contract duration; and customization control limiting the ability to create customized index products.

Each deal is decomposed by the system and stored in the form of contract elements. A deal can be a contract, a proposed contract, or potential contract. Each transaction or quote can be verified to ensure it is within an individual trader's or overall member's transaction limit by means of the real-time, risk-based pre-trade permissioning system.

The system also offers an integrated index-building feature that allows traders to structure highly customized contracts based upon indexes with existing references. These include cross-commodity spread, basket, calendar spread, Asian, and look back indexes.

The system also recognizes that a multiple term contract may require variable intermediate terms over its lifetime. As such, the system accommodates: customization of strike prices (index or array) by individual leg of the deal and customization of volumes (index or array) for each settlement date or delivery.

The risk engine underlying this system is based upon modern portfolio value-at-risk (VaR). In conjunction with integrated price feeds and a clearing interface, this system enables the system to pre-permission contract offers and to provide ongoing position maintenance support. The system also enables post-trade clearing of executed contracts, which may be used to authorize clearing and contract assurance, and to price assurance contracts based on position risk levels.

The risk-based permissioning system responds to queries both before any contract posting, response, or match and throughout the trading day over a hierarchy of various members and users. These responses incorporate not only the details of a specific deal, but also changes in individual and member portfolio composition and value as well as underlying prices. Consequently, the system continually assures compliance with trade limits at many levels throughout member organizations.

The diversity and expected evolution of target markets necessitate the design of a robust system. To facilitate current and future development, the design of the system is modular and easily accommodates new derivative types, externally developed third-party algorithms, and additional customized requirements.

While current algorithms support forwards, European calls and puts, binary, barrier and Asian options, and spreads and inter-market spreads, the template structure utilized in the transaction system allows members to structure various combinations of these elements such as collars, strips (both uniform and non-uniform), swaps, strangles, straddles, butterflies, covered calls, and spreads—all of which are permissioned and cleared using the risk-based permissioning system. Underlying assets are not limited to single products: the system also supports creation of and VaR analysis using customized indices.

The system also includes liquidity and credit adjustments at the exchange, member, instrument, and underlying product levels to support the unique requirements of numerous markets. Adjustments are also permitted in real-time to enable the active management of each market.

Decision support tools incorporated into the system provide insight into the risk profiles of users and members as well as into the behavior of underlying prices. Included are graphic displays of underlying price histories and distributions and portfolio distributions implied by Monte Carlo simulation. Also included is numerical information about prices, correlations, and categories of risks.

The system checks the member and user risk usage levels against their corresponding limits upon the posting and execution of a deal as well as throughout the day to determine if the required margin is available. When a deal is posted, the system ensures that the party posting the deal has enough margin collateral or allowed credit available so that the deal may be transacted immediately. Additionally, when the deal is executed, the system again checks the sufficiency of the originating party's margin as well as that of the counter-party. This ensures that market movements and changes in the portfolio of the originating party subsequent to posting have not materially affected the party's credit capacity.

Trader constraints ("limits") in the preferred embodiment include portfolio VaR, single-deal-risk, product, and duration restrictions, which can be imposed at the individual user, trading desk or member levels. More generally, trader constraints are a set of one or more limits on the contracts a trader is permitted to offer or accept. Trader constraints may be on contracts, on total value, on value at risk, or on any combination of data specifying its portfolio. Trader constraints are determined by the exchange rules and a member's rules, and can also be called trader restrictions.

In calculating VaR, the system uses both analytic and Monte Carlo methods. This combination of methods allows calibration of the system to the results generated by the more accurate Monte Carlo methods while retaining the efficiency of analytic methods necessary for real-time calculations. The analytic method for computing VaR uses an enhanced delta-gamma approximation while the Monte Carlo methodology uses a principal component approach designed to reduce the dimensionality and thereby improve efficiency of the simulation and overcome difficulties in correlation estimation. In the preferred embodiment, both methods employ the derivative valuations implied by the Black-Scholes and Black frameworks for underlying equity and commodity assets, respectively.

Collateral is generally valued on a daily basis, but may be valued more or less frequently depending on the available data. Portfolio value can be determined through a combination of analytics and market prices. For non-clearing members, limits are assigned by the supervising entity.

An embodiment of the permissioning system operates at numerous member and individual user levels where limits are structured to match existing internal and external hierarchical relationships. Member entities may partition and assign limits both internally and to subordinate entities. Similarly, a member may impose additional restrictions on particular internal users and subordinate members but may not assign permissions that it does not itself possess.

Figure 12:
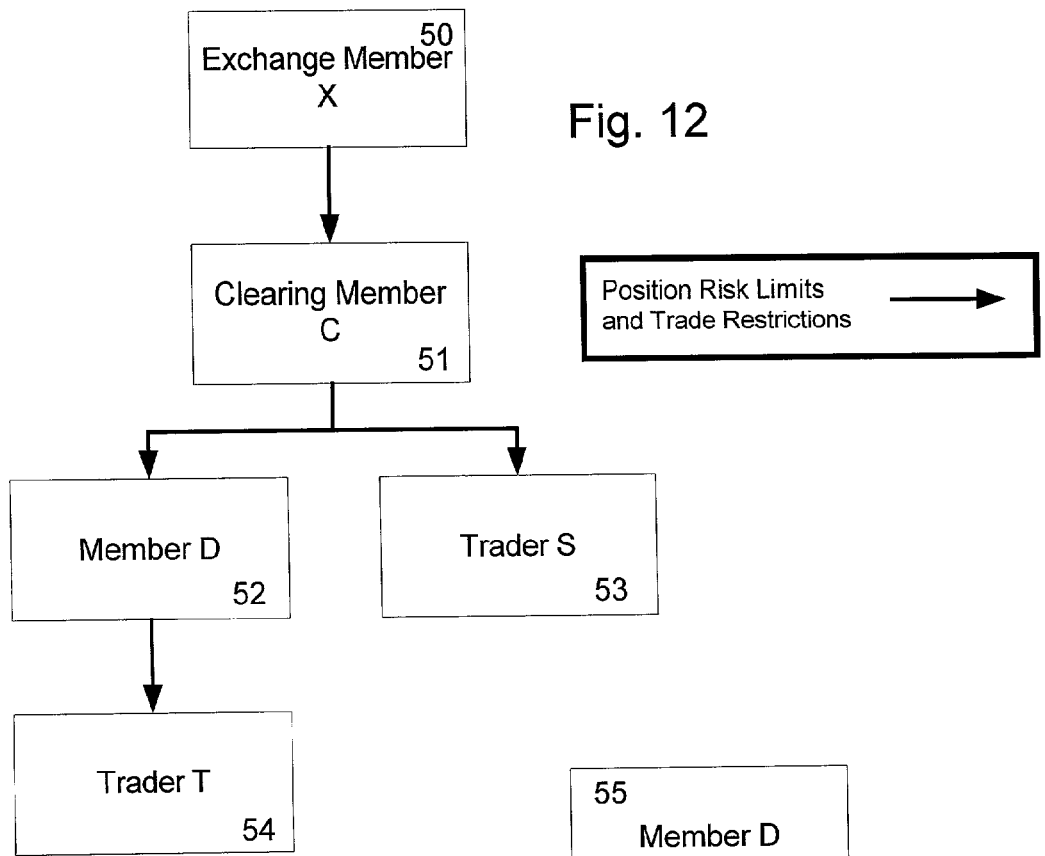
FIGS. 12 and 13 illustrate the hierarchical relationships among traders, members, clearing members, and exchange members.
Figure 13:
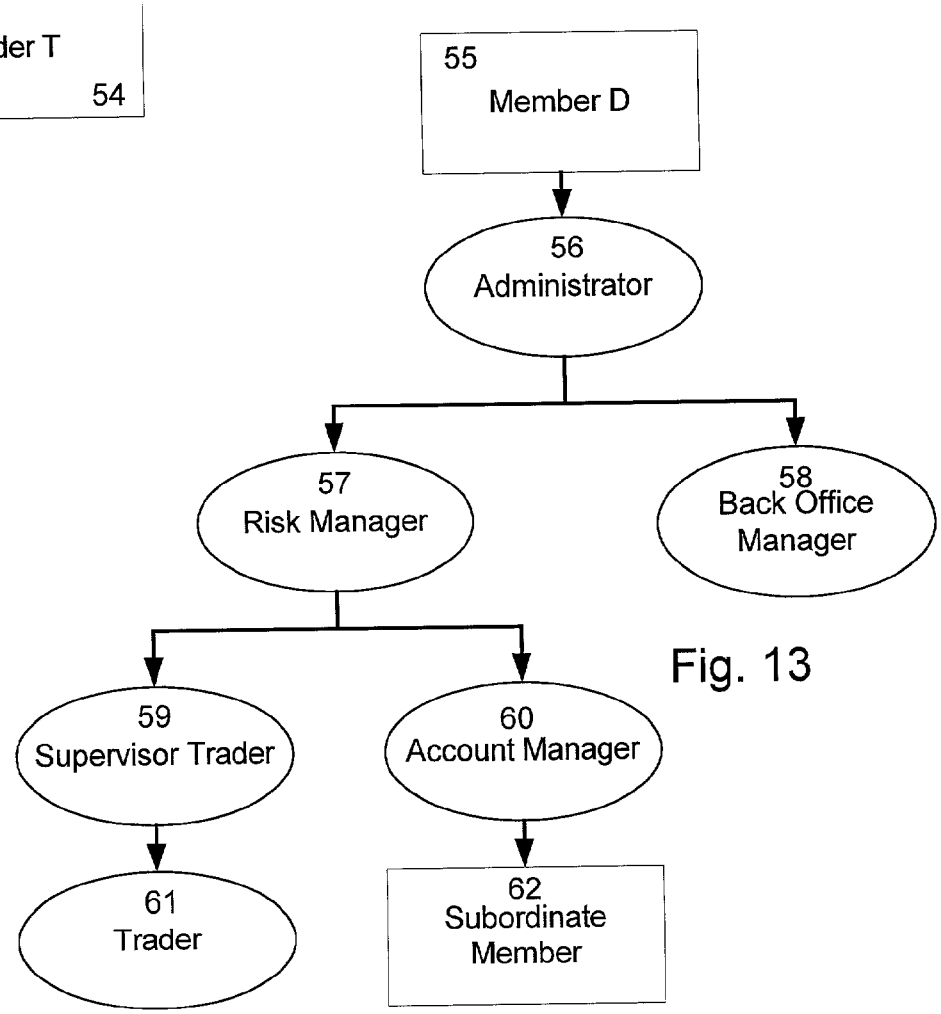

Within a member entity, different user groups are allowed different permissions and limits. While flexibility exists for tailoring these restrictions within the organization, certain hierarchical guidelines must be followed. For an embodiment of the trading environment, example member and user hierarchies for assignment of limits and restrictions are shown in FIGS. 12 and 13. FIG. 12 illustrates the hierarchical relationships that may exist among members and traders. At the highest level of permissioning lies one of the plurality of exchange members 50, which can create and manage exchanges and markets. At the next level, one of the plurality of clearing members 51 can maintain and manage collateral and position risk requirements. At the next level, one of the plurality of members 52, can authorize traders to act on its behalf or to place trades through its facilities. At the next level, one of the plurality of traders 53,54 can utilize the client application 1,3 to receive information and issue instructions. At each level in the hierarchy, position risk limits and trade restrictions can be set and enforced on subsidiary hierarchical levels. FIG. 13 provides additional detail on the manner in which a member D may manage its collateral, position risk, and trade activity. One of the plurality of members 55 can create administrators 56, risk managers 57, and back office managers 58. Reports on contract portfolios, position risk, and collateral are provided to them and actions are taken by them to set and monitor position risk limits and trade restrictions on traders 61. One of a plurality of supervisor traders 59 may be assigned position risk limits and trade restrictions, which he may allocate to one or more of the plurality of traders 61 reporting to him. The traders 61 in turn are assigned position risk and trader restrictions. Additionally, a member 55 may create subordinate members 62, who are managed through an account manager 60, who can set and manage collateral, position risk, and trade restrictions for subordinate members 62. Subordinate members may be customers, corporate subsidiaries, or other entities governed by a subordination contract with a member 55. The subordinate member 62 can in turn create a hierarchy of supervisor traders 59 and traders 61, who are authorized to receive information and issue instructions to the client application 1,3. The transaction system 2 and the risk-based permissioning system 4 enforce the position risk limits, collateral comparisons, and trade restrictions for each level of the hierarchy for each proposed contract. For example, a proposed contract may entail using the risk-based permissioning system 4 to compare position risk and collateral for a trader 61, a supervisor trader 59, a subordinate member 62, an account manager 60, and a member 55; all of whom would need sufficient available collateral prior to permitting a proposed contract to proceed. The relevant portfolios used for computing position risk of a proposed contract would be different for each level of the hierarchy.

Along with real-time permissioning, functionality for monitoring and managing limits and restrictions is also built into the system. To integrate with the hierarchical system described above, portfolios are assembled as needed for VaR calculations at each appropriate level of the hierarchy. For example, VaR calculations for deal, trader, member, and clearing member may all be necessary for permissioning. Similarly, restrictions and permissions may be monitored and viewed at various levels of the hierarchy and support personnel.

To support the needs of various unique markets, the risk-based permissioning system has employed a modular design that easily accommodates new derivative types, externally developed third-party algorithms, and additional customized requirements. Also, by working with fundamental contract elements, the system maximizes the benefits of netting across each portfolio.

The basic building blocks of the risk-permissioning system are the deal elements, each of which consists of a single future, option, spot, or spread. Deal elements may have other parameters that can be specified, for example, delivery time, delivery location, and minimum quality. A deal element can be a contract element, a proposed contract element, or a potential contract element. Smart templates, which enable a user to assemble various combinations of these building blocks, are used to facilitate the creation of a broad array of more complex, customized deals, including collars, strips (both uniform and non-uniform), swaps, strangles, straddles, and butterflies. However, in its portfolio calculations, the risk-engine used by the system bypasses these templates and focuses directly upon the deal elements, thus automatically integrating any customized deal structures into the risk-permissioning system.

Underlying assets are not limited to single exchange-traded products: the transaction system and risk-permissioning system also support creation and position risk analysis of customized indices. Like the design for structuring complex deals from deal elements, customized indices for deal elements may, in turn, be built up from weighted combinations of existing exchange traded underlying assets. Volatilities and correlations for the customized indices are derived from the underlying asset price streams.

The evolving diversity of markets necessitates the design of a robust, flexible system. The risk-based permissioning process provides a consistent framework for interfacing with its partners while allowing adjustments to the back-end systems for risk supervision. These adjustments permit the system to account for the unique nature of the derivative risks of each particular exchange, member, instrument, and underlying asset. Consequently, this approach enables flexibility and customization of the risk management systems of all partners without requiring comprehensive modifications to their systems.

Specific adjustments included in the system range from exchange VaR horizons and confidence levels to member portfolio calibrations and credit multipliers; from derivative instrument haircut levels to price stream volatility multipliers. Though many of the parameter settings are expected to be constant for given market conditions, real-time adjustments are also accommodated to enable active market management.

As part of its monitoring and management functionality, the risk-based permissioning system includes various decision support tools. These tools provide insight into the risk profiles of users and members as well as into the behavior of underlying prices, and prospective analysis of the effect of potential contract offers on a trader's position risk.

For the underlying contracts traded on the platform, the system provides graphic displays of price and volatility histories and prices distributions as well as tables of correlations among price streams for selectable historical horizons. For portfolio risk management, the system provides graphic and tabular displays of individual and collective limits across products and trader groups. For individual portfolios, the system provides distributions of price changes for selectable horizons implied by Monte Carlo simulation. In addition, the system provides automated messaging regarding limit warnings and status changes, exercise and settlement, and other system changes.

The risk engine works equally well to support conventional margining or to provide a sound analytical interface to synthetic capital facilities that may supplement or stand in lieu of this margin. The objective is to safely lower the cost of capital for traders.

For various combinations of collateral and synthetic capital, the system calculates the total allowed position risk limit equal to the sum of the allowed (haircut) collateral value, the exposure limit of synthetic capital purchased from the third-party guarantor, and the allowed (haircut) portfolio value.

Detailed Explanation of the Risk-Based Permissioning Process

The following processes are followed in the preferred embodiment:

1. A set of underlying reference products is chosen, which may be cash, futures, or options contracts. Reference products are products that are available to be referenced by a contract element. A reference product may be used directly to specify the product to be delivered, or it may be used as the basis for creating a price index for the contract element. For example, a contract element for natural gas delivery in Florida may be specified as a multiplier times the price of the reference product for the NYMEX natural gas contract, which specifies delivery at Henry Hub. The principal criteria for selection are the presence of continuous buy/sell activity, and the accurate reporting of price information.

2. A set of derivative contract types is chosen, which form the elemental building blocks of a structured contract. These are called "deal elements", and are chosen based on the availability of an analytic solution for value and position risk. These deal elements can be options, futures, Asian options, binary options, knock-in/out options, swaps, swaptions, or American options, among others. Additional elements can be incorporated upon the discovery of new analytic approximations for value or position risk.

3. Sets of business rules are created that define the scope and type of higher-level structured contracts made available to a user. In the current implementation these are structures such as collars and spreads, which may be considered to be combinations of individual deal elements. In the current implementation, each structured contract is represented to the user by a Smart Template, which encodes knowledge of the allowable combinations.

4. A set of control variables is added at appropriate points in the formulas, in such a manner as to allow the adjustment of covariance (i.e. both volatility and correlation), time horizon, interest rate, value, and position risk. The current implementation provides an in-depth example of where and how these control variables are located.

5. The formulas are programmed in such a way that speed of calculation is of prime importance. Various approximations can be included in the formulas that reduce calculation time, by ignoring terms in the equation that are relatively unimportant, and by so ordering the calculations that the specific manner of computation devised in a computer or compiler are advantageously exploited. In the current implementation, certain portions of the computation are computed prior to a need for real-time estimation so as to further speed performance in a real-time environment.

6. An appropriate mapping matrix is defined between products that may be allowed reference products in defining a structured contract and those reference products used in the position risk calculation. The primary purpose of this mapping is to permit the reduction in size of the covariance matrix. The size of the covariance matrix in a complex portfolio of contracts can be an important factor in overall timeliness of the calculations in a real-time environment.

7. An appropriate risk supervision computational environment is implemented that achieves the desired level of accuracy in estimating the portfolio-level position risk. As mentioned, this environment is not restricted in the timeliness of computation, and can be a standard simulation model or even a suitably modified proprietary model.

8. The risk supervision model is modified to produce the specific settings of the control variables that will cause the real-time module to be calibrated to the risk-supervision module and thus produce a more accurate estimate of position risk.
   a. This requires using the risk supervision model to estimate position risk to whatever level of accuracy and confidence level are desired.
   b. The analytic real-time module is then mathematically inverted to express the resultant position risk estimate as a function of the control variables.
   c. Finally, the control variables are chosen so that the real-time module is calibrated to the risk supervision module.
   d. The scope and type of control variables has been chosen to enable this calibration to occur in all of the key sensitivities to the value of derivative contracts.

9. The control variables are periodically adjusted based on desired level of re-synchronization. The appropriateness of the adjusted control variables will decline at a variable rate that depends on the nature of an individual portfolio of contracts. Thus, the periodicity with which the risk supervision module is utilized can be adjusted depending on the overall level of risk in a portfolio. More frequent synchronizations would be required for more risky portfolios. This flexibility permits a wide variety of synchronization strategies to be developed.

10. A communication mechanism is developed that effectively transmits the updated control variables from the computer environment in which the risk supervision module is performed to the computer environment in which the real-time position risk is computed. In the current embodiment, the communication medium is an internet-based XML message set. This implementation permits a distributed architecture in which the real-time calculation and the risk supervision calculation can be distantly separated without degrading performance. It also permits real-time coordination of a distributed architecture for transaction permissioning in which parts of the position risk estimate are located in different servers or in different geographic locations.

11. Prior to an initial transaction, the control variables are initialized based on the anticipated portfolios for each allowed trader and/or contract counter party. These control variables are set based upon simulation or other analysis of the reference products, price histories, derivative types, desired confidence levels, and credit risk.

12. In the period prior to contract creation, those portions of the computation that can reasonably be recalculated and stored in memory are performed.

13. At the time of contract creation, the user creates a structured contract by selecting from among the available deal elements, which may be simply one deal element.

14. At the time of contract, the real-time position risk estimate is performed in a manner that combines the counter party's entire existing portfolio (which may be many contracts, each composed on many deal elements), the current setting of the control variables, and any pre-calculated quantities to produce a single number representing position risk.

15. This number is then compared against an allowed level of position risk, and the proposed transaction can then be allowed to continue or be denied based upon the comparison. This procedure allows a wide variety of methods for determining position risk. One method would be to set position risk based on financial collateral each counter party has set aside. Another method would be to create an assurance contract in which a guarantor underwrites the risk of loss for a fixed fee, or for a fee proportional to the estimated risk level.

16. In a real-time environment, this calculation has demonstrated performance on large portfolios of contracts in sub-second response times. With appropriate commercially available high-end computer technology responsiveness times can be increased, as needed, depending on the size of the portfolios, the number of users, and the communication delays.

17. Each stage in the process of creating, offering, counter-offering, modifying, and canceling a proposed contract is subjected to permissioning based on the real-time position risk calculation.

To explain the risk-based permission method, mathematical variables are defined and formulas that are used in the preferred embodiment are explained, as well as other embodiments that might be useful.

Value at risk (VaR) is defined, as is it is often presented in the literature, and then how the present invention modifies the calculation is explained. Value at risk for a portfolio is a one-sided confidence interval on portfolio losses and may be defined mathematically as:

$$Pr[\Delta V_A(T^{Var}, \Delta \tilde{x}) \geq -\text{VaR}_A] = 1 - \alpha \qquad (1)$$

where
Pr Probability
$T^{Var}$ The risk horizon of interest
$\text{VaR}_A$ Value at risk for portfolio A
$\alpha$ Confidence level
$\tilde{x}$ a vector of random state variables
$\Delta \tilde{x}$ changes in the random state variables
$V_A$ The value of a portfolio of deal elements
$\Delta V_A$ The change in the value of portfolio A
A The portfolio of deal elements that is of interest
a A deal element in portfolio A.

This formulation is applicable to any portfolio, any set of state variables, and any process governing the stochastic evolution of the value of the portfolio. It is common in the literature to restrict the nature of deal elements in the portfolio, the nature of the state variables, and the nature of the stochastic price process that governs changes in the value of the portfolio in order to create tractable analytical structures. For example, the portfolio may include deal elements that are securities, equities, bonds, options, futures, derivatives, or other assets. The state variables may be prices on deal elements, events that affect prices, external events, credit ratings, or other risk factors. The price process may be a named stochastic process or may have jumps, reversion, non-Markovian state evolution, stochastic volatility, discontinuities, or other features. Equation (1) can be rewritten as $$\int_{-\infty}^{-\text{VaR}_A^*} Pr[V_A(T^{Var}, \tilde{x})] d\tilde{x} = 1 - \alpha \qquad (2)$$

The symbol $\text{VaR}^*_A$ denotes the result of calculating value at risk by using the most appropriate available methods and technology where computational speed is not required. To be explicit about the dependence of $\text{VaR}^*_A$ it may be written as $\text{VaR}^*_A (\Delta V_A(T^{Var}, \Delta \tilde{x}), \alpha)$ to emphasize that value at risk is taken with respect to a specific confidence level $\alpha$, a specific time horizon $T^{Var}$, and a specific valuation methodology $\Delta V_A$. $\text{VaR}^*_A$ in practice is approximated using combinations of simulation, decision tree, historical, or parametric methods. For many portfolios of interest, accurate estimation of $\text{VaR}^*_A$ requires very large simulations, and when early exercise of options is considered a stochastic dynamic programming approach. Because evaluating $\Delta V_A$ is computationally expensive, parametric methods are often utilized to achieve approximate results more rapidly. In the literature, many of the practical applications for computing value at risk rely on parametric methods.

In one parametric method, the mathematical form of the distribution on $V_A$ is restricted by assuming that $V_A$ has derivatives with respect to each argument, that the state variables are the prices of the deal elements, and that the periodic changes in value of $V_A$ with respect to each argument are jointly normally distributed with mean zero. This is called the delta-normal method, which will be denote by VaR'. The value of the contract, given the assumptions, will be called $V'_A$. The parametric approach assumes $V'_A \approx V_A$. Then the literature shows $$VaR' = -\Theta_A T^{Var} + Z(\alpha)\sqrt{g^T \Sigma g} \quad (3)$$

where g a vector of $$\frac{\delta V_A}{\delta \tilde{x}_i}$$

for all $x_1$ $g^T$ the transpose of g $Z(\alpha)$ the $\alpha^{th}$ percentile of the standard unit normal distribution $\Sigma$ covariance matrix for the joint normal distribution on returns to $\tilde{x}$ $\Theta_A$ the derivative of $V_A$ with respect to time $$\frac{\delta V_A}{\delta T}$$

Other preferred embodiment may utilize a more appropriate parametric method than presented in equation (3); however, the present invention will be explained with respect to (3) for purposes of clarity.

Figure 18:
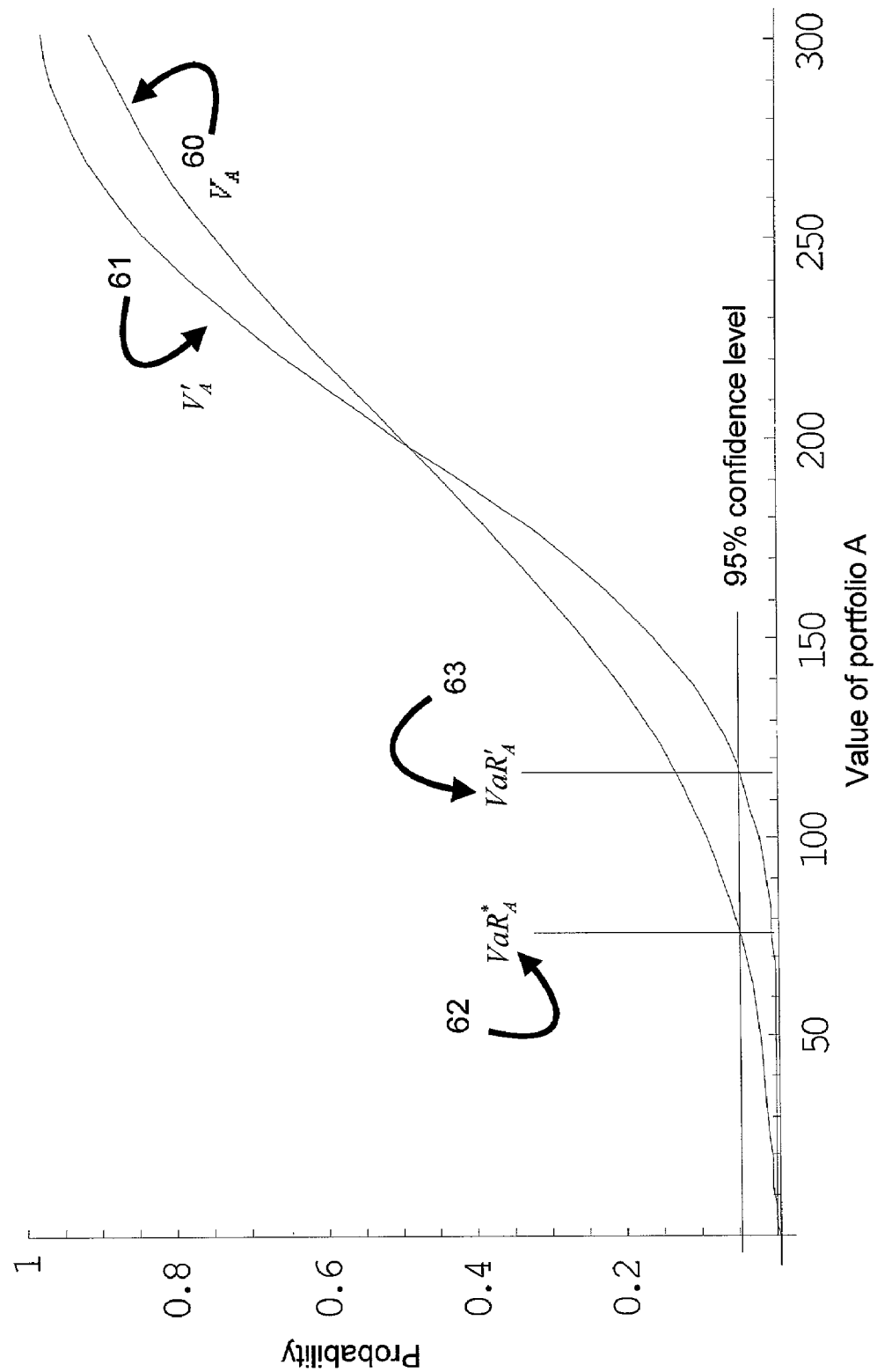
FIG. 18 illustrates a graph of the real-time position risk and supervision position risk calculations.

It is observed that there are many methods of computing value at risk, and among them are $VaR^*_A$, which is intended to produce an accurate estimate of value at risk, and $VaR'_A$, which is intended to be computationally fast. Other parametric forms could be used. For example, in applications referred to as extreme value theory (EVT), the parametric VaR will use a formula that is only intended to approximate the tail of the distribution since that is the region of most interest. FIG. 18 illustrates graphically the difference for a hypothetical portfolio and for the choice of $\alpha=95\%$. Curve 61 illustrates the probability distribution for the portfolio A using the approximation $V'_A$, and curve 60 shows the probability distribution on $V_A$ that would be computed without the restrictive assumptions. These may produce significantly different estimates of value at risk. In fact, $VaR'_A$ 63 is viewed as an approximation of $VaR^*_A$ 62. The present invention applies this observation to insert control variables $\tilde{C}$ into the standard parametric VaR equations in a manner such that the parametric equations result in a closer approximation to $VaR^*_A$. The new estimate of value is called at risk position risk $PR'_A$ to emphasize its modification from the standard form and may be written as:

$$VaR^*_A(T^{Var}, \Delta \tilde{x}, \alpha) \approx PR'_A(T^{Var}, \Delta \tilde{x}, \alpha, \tilde{C}) \quad (4)$$

and then solved for the control variables $\tilde{C}$ that minimize the difference as in equation (5)

$$\tilde{C} = \arg \min_C \{|PR'_A(T^{Var}, \Delta \tilde{x}, \alpha, \tilde{C}) - VaR^*_A(T^{Var}, \Delta \tilde{x}, \alpha)|\} \quad (5)$$

or some other method may be used for choosing the control variables $\tilde{C}$. For example, a maximum likelihood estimate could be used, or changes could be minimized to the control variables over time.

To further illustrate the approach, equation (3) is modified with several sets of control variables $C_1$, $C_2$, and a vector $\tilde{c}$ that are multiplicative factors applied to $\Theta_A$, $Z(\alpha)$, and $\Sigma$ to produce $$PR'_A = -C_1 \Theta_A T^{Var} + C_2 Z(\alpha)\sqrt{g^T \Sigma \tilde{c} g} \quad (6)$$

The purpose of these control variables is to adjust the result of the parametric estimate of value at risk so as to better approximate the result of $VaR^*_A$. Other parametric forms would have control variables appropriate to the particular parametric formulation.

The preferred embodiment uses a version of parametric value at risk that incorporates additional features described below. This method will be referred to as $PR_A^P$. In the preferred embodiment, the control variables have been chosen with the viewpoint that $VaR^*_A$ can generally be computed within a 24-hour period, while $PR_A^P$ is generally constrained to tight time limits in order to support a rapid throughput of processing transactions. The calculation of $PR_A^P$ is performed by the real-time position risk system 17 (FIG. 4), while calculation of $VaR^*_A$ is performed by the position risk supervision system 18.

In the preferred embodiment, to calculate $PR_A^P$, it is observed that the preferred embodiment is intended to operate in a transactional environment in which prices of multiple deal elements are periodically being generated either by the transaction system 2, or by an external source of information 5. These prices of multiple deal elements being periodically generated are "price streams". More generally, a price stream is a time sequence of prices for a contract element that reports the prices of executed contracts or contract elements either on the exchange or in another market. The price stream includes both historical and current prices, and may include both closing prices and the prices of every contract executed or averages over partial or multiple contracts.

The following notation is used in the preferred embodiment with respect to computing various preliminary inputs for $PR_A^P$.

A The portfolio of deal elements of interest for a calculation of position risk $I_a$ The set of price streams i referred to by deal element a.

$I_A$ the union of price streams $I_a$ such that a $\in$ A.

$S_0^i$ Initializing closing price of price stream i $cov_0^i$ Initializing covariance of price streams i and j stored $f^i$ An indicator denoting whether price stream i represents a future or spot $\psi^i$ An indicator denoting whether price stream i represents a spread $\lambda^i$ Weighting used in exponential weighted variance calculations for price stream e The exponential constant $\pi$ Pi $N'[x]$ The standard normal probability density function of x $N[x]$ The standard normal cumulative distribution of x $S^i$ Current price for price stream i on day t $S_{t-1}^i$ Closing price of price stream i on day t-1

$S_t^i$ Closing price of price stream i on day t $cov_{t-1}^{ij}$ Covariance of price streams i and j through day t-1

$cov_t^{ij}$ Covariance of price streams i and j through day t $\rho_t^{ij}$ Correlation between price streams i and j on day t $s\tilde{t}d_t^i$ Standard deviation of price stream i on day t adjusted with $\xi^i$ $u_t^i$ Daily return for price stream i from day t-1 to day t The preferred embodiment obtains the necessary information from storage or by querying the interprocess communication system, and calculates the following for each price stream each day:

$$u_t^i \equiv \frac{S_t^i - S_{t-1}^i}{(1-\psi^i)S_{t-1}^i + \psi^i}$$

$$u_t^{ij} \equiv u_t^i \cdot u_t^j$$

$$\lambda^{ij} \equiv \sqrt{\lambda^i \cdot \lambda^j}$$

$$\text{cov}_t^{ij} \equiv \lambda^{ij} \cdot \text{cov}_{t-1}^{ij} + (1-\lambda^{ij}) \cdot u_t^{ij}$$

$$\text{std}_t^i \equiv \sqrt{\text{cov}_t^{ij}}$$

$$\rho_t^{ij} \equiv \frac{\text{cov}_t^{ij}}{\text{std}_t^i \text{std}_t^j}$$

The following control variables are defined in the preferred embodiment; however, it is understood that applying additional control variables to achieve the purposes of speed and accuracy, or other desirable aspects of operation, would be straightforward.

Control variables:

$\tilde{M}^a$ A scalar multiplier that is applied to the underlying volatility of deal element a $\Omega^x$ A multiplier of value volatility adjusting for a member's credit risk $\Omega_\Delta, \Omega_\Gamma, \Omega_\Theta, \Omega_Y$ Multipliers to adjust $\tilde{\Delta}^{tot}, \tilde{\Gamma}^{Tot}, \tilde{\theta}^{Tot}, \tilde{Y}^{Tot}$ contributions to position risk $\zeta^i$ Multiplier to adjust standard deviation in price stream i $E^{n,i}$ Amount of price stream i in reference product n $h^{i,o}$ A value discount for a particular price stream i and option type o The control variable $\zeta^i$ is used to adjust the computed exponentially weighted standard deviations of the price streams in order to provide a real-time adjustment to changing volatility levels that are identified in the risk supervision system.

$$\text{std}_t^i = \zeta^i \text{std}_t^i$$

Notation is introduced to explain how the preferred embodiment uses the quantities defined above to compute additional intermediate quantities for each deal element. The concept of reference product is introduced to facilitate computations involving deal elements that refer to indexes or products for which no price stream exists.

$R^{a,n}$ Amount of reference product n in index underlying deal element a $Q^a$ The quantity of deal element a in portfolio A. The conventions are that long positions are positive and short positions are negative $I_n$ set of price streams i such that $E^{n,i} \neq 0$.

$N_a$ set of reference products n such that $R^{a,n} \neq 0$.

$I_a$ set of price streams i such that $K^{a,i} \neq 0$ $K^{a,i}$ The amount of price stream i in deal element a $T_t^a$ The number of calendar days between the current date and the expiration of deal element a $r_t^a$ The continuously-compounded market interest rate on day t for zero-coupon bond with time to maturity of $T_t^a$ $P_t^a$ Close price of underlying index of deal element a on day t $\sigma_t^a$ The daily price volatility of the underlying index of deal element a on day t $dt_t^a$ The number of trading days within the averaging period of Asian deal element a $W_t^a$ or $Y_t^a$ The average (geometric or arithmetic) of the underlying value to date from the beginning of the averaging period for Asian deal element a $\tilde{P}^a$ Current price of underlying index of deal element a $$K^{a,i} \equiv \sum_{n \in N_a} R^{a,n} \cdot E^{n,i}$$

$f^a$ An indicator denoting whether deal element a is based upon a future ($f^i=1$)

$$f^a = \begin{cases} 1 & \text{if } \forall \text{ is.t.} K^{a,i} \neq 0, f^i = 1 \\ 0 & \text{if } \forall \text{ is.t.} K^{a,i} \neq 0, f^i = 0 \end{cases}$$

$^a$ An indictor denoting whether deal element a is a spread contract $$(\psi^i = 1)\psi^a = \begin{cases} 1 & \text{if } \forall \text{ is.t.} K^{a,i} \neq 0, \psi^i = 1 \\ 0 & \text{if } \forall \text{ is.t.} K^{a,i} \neq 0, \psi^i = 0 \end{cases}$$

The following two equations define deal element volatility (i.e. standard deviation of returns for the deal element) depending on whether the deal element is a spread:

If $\psi^a = 0$, then $\sigma_t^a \equiv \sqrt{\ln\left(\frac{\sum_{i \in I_a}\sum_{j \in I_a} K^{a,i}K^{a,j}S_t^i S_t^j\left(e^{\text{std}^i \text{std}^j \rho_t^{ij}} - 1\right)}{(P_t^a)^2} + 1\right)}$ If $\psi^a = 1$, then $\sigma_t^a \equiv \sqrt{\sum_{i \in I_a}\sum_{j \in I_a} K^{a,i}K^{a,j}\tilde{\text{std}}^i \tilde{\text{std}}^j \rho_t^{ij}}$ The following two formulas accumulate running averages for purposes of arithmetic and geometric options:

$$Y_t^a = \begin{cases} 0 & \tau \geq 0 \\ \frac{-1}{\tau}\sum_{i=1}^{-\tau} P_{t-1} & \tau < 0 \end{cases}$$

$$W_t^a = \begin{cases} 0 & \tau \geq 0 \\ \exp\left(\frac{-1}{\tau}\sum_{i=1}^{-\tau} \ln(P_{t-1})\right) & \tau < 0 \end{cases}$$

The closing prices and current prices for deal element a is the weighted average of the prices of its underlying referenced price streams;

$$P_t^a \equiv \sum_{i \in I_a} K^{a,i} \cdot S_t^i$$

$$\tilde{P}^a \equiv \sum_{i \in I_a} K^{a,i} \cdot \tilde{S}^i$$

Note in the following formula the use of the control variable $\tilde{M}^i$:

$$\tilde{M}^a \equiv \frac{\sum_{i \in I_a} K^{a,i} \tilde{M}^i}{\sum_{i \in I_a} K^{a,i}}$$

Note in the following formula the use of the control variable $h^{i,o}$:

$$\tilde{H}^a \equiv 1 - \text{sign}[Q^a] + \text{sign}[Q^a] \cdot \frac{\sum_{i \in I_a} K^{a,i} \cdot \tilde{h}^{i,o}}{\sum_{i \in I_a} K^{a,i}}$$

The portions of the process that compute the value of each deal element and various derivates that represent the rate of change of the value of each deal element with respect to an underlying state variable are introduced. Some additional notation is first introduced:

$\tilde{P}^a$ The current price of the index underlying deal element a $\sigma_t^a$ The daily price volatility of the index underlying deal element a $X^a$ The price per unit-of-measure of deal element a $T^a$ The number of calendar days between the current date and the expiration date of deal element a $r_t^a$ The continuously compounded market interest rate for zero-coupon bond with time to maturity of $T^a$ $\tilde{\Delta}^a$ Change in value of deal element a when price of underlying instrument changes $\tilde{\Gamma}^a$ Change in $\tilde{\Delta}^a$ of deal element a with respect to price of underlying $\tilde{\Theta}^a$ Change in value of deal element a with respect to the time to expiry $\tilde{Y}^a$ Change in the value of deal element a with respect to $\sigma_t^a$ of the underlying price The formulas for a standard call option are presented. The formulas for other deal elements (e.g. futures, put options, Asian options, digital options, etc.) are used in a similar manner. A person of ordinary skill would be able to make the appropriate modifications to the standard formulas. The formulas are used to provide fast computation of the derivatives of $V^a$ with respect to the state variables.

$$q = \begin{cases} r_t^a & f^a = 1 \\ 0 & f^a \neq 1 \end{cases}$$

The superscripts, a, are used to represent a single deal element and present the standard formulas for the value and for the partial derivatives of a call option, which are described in the literature. The inputs to this formula are the adjusted quantities after applying the control variables. These would be computed for each deal element, using the relevant formulas for each deal element respectively:

$$dI^a \equiv \frac{\ln\left(\frac{P^a}{X^a}\right) + (r_t^a - q + 2\sigma^{a2})T^a}{\sigma^a \sqrt{T^a}}$$

$$d2^a \equiv dI - \sigma^a \sqrt{T^a}$$

-continued $$V^a \equiv H^a \cdot \left(P^a e^{-qT^a} N[dI^a] - X^a e^{-rT^a} N[d2^a]\right)$$

$$\tilde{\Delta}^a \equiv \frac{\delta V^a}{\delta P^a} = e^{-qT^a} N[dI^a]$$

$$\tilde{\Gamma}^a \equiv \frac{\partial^2 V^a}{\partial P^{a2}} = e^{-qT^a} N'[dI^a] P \sigma^a \sqrt{T^a}$$

$$\tilde{\Theta}^a \equiv \frac{\delta V^a}{\delta t} = -P^a e^{-qT^a} N'[dI^a] \sigma^a 2\sqrt{T^a} - r_t^a X^a e^{-rT^a} N[d2^a] + qP^a e^{-qT^a} N[dI^a]$$

$$\tilde{Y}^a \equiv \frac{\delta V^a}{\delta \sigma^a} = P^a e^{-qT^a} N'[dI^a] \sqrt{T^a}$$

Any parametric formula for any future or option can be modified in a similar manner. For example, the literature describes numerous formulas for a wide variety of derivatives, such as futures, options, Asian options, digitals, American options, options on indices, barriers, etc.; and for a wide variety of probability processes, such as Brownian motion, stochastic jumps, stochastic volatility, mixed distributions of market and credit risk, default events, etc. Any parametric formula may be modified for a deal element. Some of the quantities can be precomputed on a daily basis, or recomputed periodically on a less than real-time basis (e.g. hourly), and stored for retrieval by the real-time position risk system 17.

To calculate $PR_A^P$, some additional notation is introduced:

$r^{Var}$ The continuously compounded risk-free interest rate for time to maturity $T^{Var}$ $$S_m^i = \begin{cases} 1 & \psi^a = 1 \\ S^i & \psi^a \neq 1 \end{cases}$$

$\tilde{\sigma}^{Tot}$ Standard deviation of daily return of total portfolio A $\tilde{\Delta}^{Tot}$ Change in value component of the portfolio for underlying price changes $\tilde{\Gamma}^{Tot}$ Change in $\tilde{\Delta}^{Tot}$ when price of underlying instrument changes $\tilde{\Theta}^{Tot}$ Change in value component of the portfolio with respect to the time to expiry $\tilde{Y}^{Tot}$ Change in value component of the portfolio with respect to $\tilde{\sigma}^{Tot}$ The standard deviation on daily returns for the distribution is:

$$\tilde{\sigma}^{Tot} \equiv \sqrt{T^{Var} \sum_{i \in I_A} \sum_{j \in I_A} S_m^i S_m^j std^i std^j \rho_t^{ij} \left(\sum_{a \in A} K^{a,i} Q^a \tilde{\Delta}^a\right)\left(\sum_{a \in A} K^{a,j} Q^a \tilde{\Delta}^a\right)}$$

The rates of change of value for the portfolio A with respect to the state variables are:

$$\tilde{\Delta}^{Tot} \equiv T^{Var} r^{Var} \sum_{i \in I_A} (1 - f') Sm^i \left(\sum_{a \in A} K^{a,i} Q^a \tilde{\Delta}^a\right)$$

$$\tilde{\Gamma}^{Tot} \equiv \frac{1}{2} T^{Var} \sum_{i \in I_A} \sum_{j \in I_A} Sm^i Sm^j std^i std^j \rho_t^{ij} \left(\sum_{a \in A} K^{a,i} K^{a,j} Q^a \tilde{\Gamma}^a\right)$$

-continued $$\tilde{\Theta}_{Tot} \equiv T^{Var} \sum_{a \in A} Q^a \tilde{\Theta}^a$$

$$\tilde{Y}_{Tot} \equiv \sum_{a \in A} \tilde{M}^a \sigma_t^a Q^a \tilde{Y}^a$$

Allowed value is the collateral credit allowed for the current portfolio A.

$$\text{Allowed Value} \equiv \sum_{a \in A} Q^a \tilde{V}^a$$

Note the use of the control variable $\tilde{\Omega}$. The standard multiplier is incorporated with an adjustment to reflect the credit risk of the member x.

$$\tilde{\Omega} = \tilde{\Omega}^x \cdot Z(\alpha)$$

Position risk for the portfolio A is:

$$\text{Position Risk} = PR_A^P = (\tilde{\Omega} \cdot \tilde{\sigma}^{Tot}) - (\tilde{\Lambda}^{Tot} + \tilde{\Gamma}^{Tot} + \tilde{\Theta}^{Tot} + \tilde{Y}^{Tot}) \quad (7)$$

Equation (7) provides a calculation of position risk that is based on $VaR_A^*$ while enabling the use of faster parametric computations. In light of this observation, equation (7) is intended to provide a balanced estimate of position risk that accounts for the volatility of portfolio returns, exposure to default risk, exposure to passage of time, exposure to changes in the volatility of prices, and exposure to the shape of $V_A$ ($T^{Var}, \tilde{x}$). Other reasonable formulas for computing position risk in real time may be used.

The method is new partly because it 1) coordinates multiple existing technologies into one functioning system through the use of unique control variables, 2) provides a unique method for decomposing complex contracts based on permissioning objectives, and 3) provides a reference product mapping capability that improves risk analysis and reduces the dimensionality.

Previously, attempts have been made to develop a tradeoff between speed and accuracy, viewing different VaR methods as offering different points of tradeoff between these objectives. No known method attempts to integrate multiple position risk methods into a single position risk calculator in which parts of the calculation operate to different speed and accuracy objectives.

The present method achieves both speed and accuracy, through a coordinated procedure involving different methods. The present method achieves both speed and accuracy through the use of alternate reference price pointers. These allow the supervision to choose the underlying risk vector on which collateral is based.

The invention is a method for determining position risk in real time that achieves a pre-specified likelihood that financial resources in the event of default will be sufficient to meet contractual obligations. The method achieves several objectives hitherto unavailable: 1) the method can be implemented in a real-time exchange procedure to permission transactions prior to execution, 2) the method can achieve a predefined confidence level taking credit rating into account, 3) the position risk calculated is dynamically adjusted to current market price conditions, 4) the method nets position risk across a portfolio of contracts, 5) collateral can be sized to position risk and collected prior to contract execution, 6) position risk is determined by a quantitative confidence level, and 7) the method is applicable to contracts whose value is a non-linear relationship with market prices.

A new method has been described for deciding which transactions should be permitted that offer several unique features within a transaction environment:
  i. matches collateral requirements with the risk characteristics of a proposed transaction
  ii. dynamically adjusts collateral requirements to changing market conditions
  iii. provides a risk-based method for defining the magnitude of a performance bond
  iv. creates financial incentives for balanced risk by sizing collateral to financial risk levels of traders
  vi. dynamically adjusts permitted transactions according to the most recent available information regarding counter party risk.

Detailed Explanation of Integrated Electronic Exchange of Structured Contracts

The invention provides a process that enables structured derivative contracts to be created, traded, permissioned, and settled in an electronic market. The invention provides processes that enable a consistent risk-based framework for authorizing and permissioning the creation, negotiation, execution, and settlement of structured contracts. These processes are intended to utilize the technologies of exchange automation and risk-based permissioning to enable trading of complex derivative contracts, wherein contract performance is continuously assured through risk-based permissioning.

Figure 20:
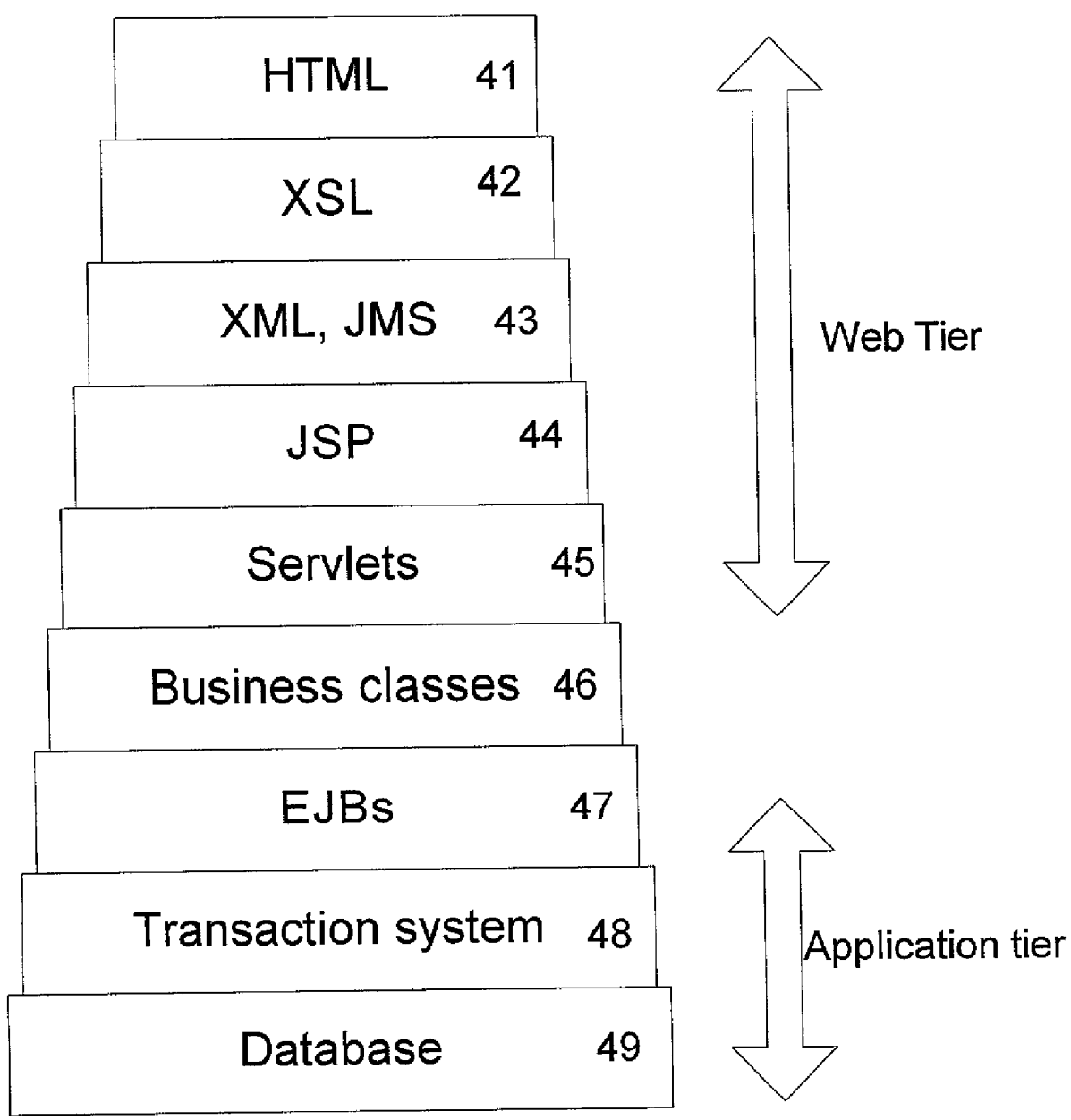
FIG. 20 illustrates the multiple tiers of technology used in the preferred embodiment.

First, the subsystems of the client application system 1, as presented in FIG. 3, will be discussed:
  1. Interprocess communication 7—The interprocess communication system 7 handles communications among the subsystems in the client application 1 and between the client application 1 and the network 6. The preferred embodiment utilizes a layered system of technologies that enables distributed storage and processing in support of the various user requirements. FIG. 20 illustrates the technologies used in the preferred embodiment. The preferred embodiment is a J2EE (enterprise Java) based exchange. As such, the core technologies underlying the system are servlets/JSP 45, 44, EJBs 47 and JMS 43. J2EE (Java 2 Platform, Enterprise Edition) is a set of specifications describing APIs on which an enterprise level application can be quickly built. Because J2EE is a specification rather than an implementation, the system can utilize a variety of application server vendors. Being specifically designed for this kind of component-based programming, it delegates much of the low-level programming to the application server, allowing developers to concentrate on business logic with the corresponding savings in development time and maintenance costs. The core technologies of J2EE are Enterprise JavaBeans and the JSP/Servlet spec. EJBs 47 are software components, designed to represent discrete parts of application data or logic. A Session Bean encapsulates a particular business process or processes, and has no long-term persistent state. An Entity Bean represents a piece of persistent data that usually maps to a row or rows in the database. JSPs 44 and servlets 45 are the technologies for providing a web-based front end to the J2EE application. They are designed to facilitate the quick and easy development of highly customized web functionality. The system is built around an n-tier architecture. In the web tier, multiple servlet containers run the web application composed of servlets 45 and JSPs 44. These make calls back to the application server tier where EJBs 46 handle the transactions, persistence, and resource pooling. Calls can be made back to the transaction system 48 or directly to the database 49. In either case, the EJBs 47 and business classes 46 enable alternate transaction systems and databases to be utilized by abstracting the data structures and processing requirements for the transaction system 2. The data store can be fulfilled by many of the major database products that can be used. The application server can be clustered to preserve user session information in case of server failure, and for load balancing purposes. It makes use of IP multicasting for this purpose. No transactional or long term persistent data resides in the web tier; therefore the consequences of a catastrophic failure here would be only the loss of session information with the subsequent requirement that the end user re-login and re-establish a session. Security at the web tier is delegated to the application server. At the time of login, a JNDI context is established and the credentials of the user are passed back. If the user exists, has given the right password, and has the right roles and permissions, they are allowed to continue into the site and make use of the back end functionality. The role of the web tier is threefold: 1) to maintain the state of the user's session; 2) to manage and direct their progress through various processes on the site, and 3) to deliver them a view of the state of the system. Session information, as mentioned, is maintained using the standard session object specified in the servlets specification. Servlets 45 are used to shepherd the user through the various processes—such as creating a deal—and verify the screen order, actions, etc. The business logic, represented as business classes 46, contained in the servlets and the utility classes they call is enough to manage the process state, do some validation, and then dispatch calls back to the EJBs 47 in the application server tier where transactions and persistence occur. Finally, at the end of any request, the request is redirected to a JSP page that returns XML 43 representing the state of the process. The XML 43 is then transformed into xHTML 41 using XSL 42 stylesheets and returned to the client browser (e.g. HTML 41). The use of XSLT, while adding some overhead to each request, enables maintaining near-complete separation of form and content, resulting in tremendous flexibility in terms of user interface. Information about deals, orders, and position risk can stay in HTML-agnostic format until the very last step. This flexibility is vital to the present invention because position risk is a function of the user's order, the user's contract portfolio, the portfolios of other traders in the user's member organization, the market prices for all relevant contract elements, the market value of the user's available collateral, and other dynamically changing market and portfolio data. Speed and responsiveness are enhanced by maintaining the data in this manner. The datatypes and state of the XML 43 output by the JSP 44 pages reflect only business classes 46. The XSL 42 style sheets render this information into appropriately styled HTML 41 forms. Thus, another client application 1,3 or system could be granted a view of the system in this or another flavor of XML 43 without having to touch the other layers of the application.

2. Initialization system 8—The initialization system 8 performs the initial authorization and user setup requirements. When the user begins a session, communications with the inter-process communication system 7 are begun, initial data structures crated, and initial logic structures loaded into the distributed client.

Figure 16:
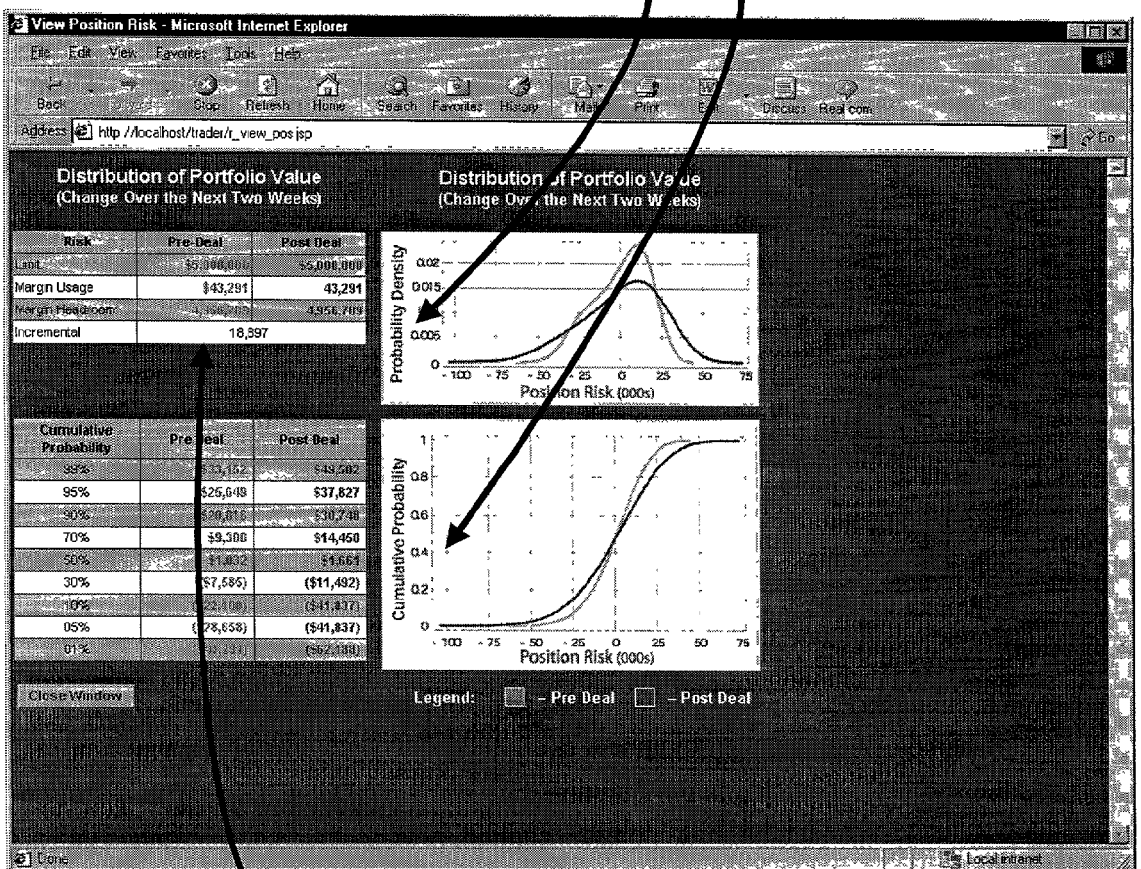
Figure 17:
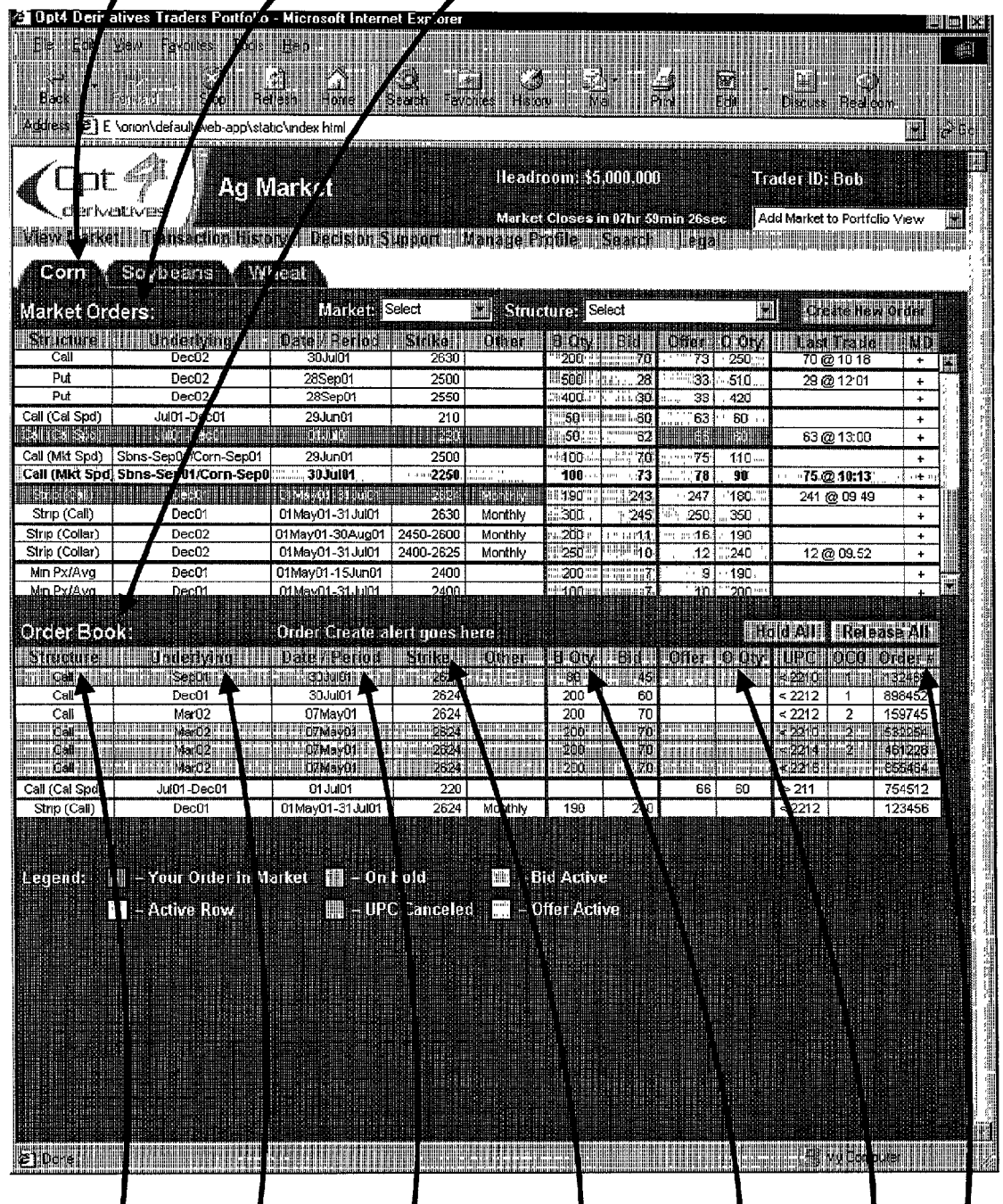

3. User interface 9—The user interface 9 consists of a hierarchical series of templates that present information to the user and enable various data inputs and instructions to be entered by the user. FIGS. 14-17 illustrate several of the plurality of templates used in the preferred embodiment. In FIG. 14, an example of one of a plurality of different templates for creating a new order is seen. The purpose of the order entry templates is to provide the user with a fast and flexible order creation capability. In FIG. 14, the user would have selected the product 70 and the structure 71. In other, more complex orders, the user might create new structures from many products and structure types. The position risk of a structure requires specification of the structure in the order creation process, among other data. The user would next specify the underlying 72 (e.g. the reference product underlying the structured contract, for example, December 2002 delivery of corn), the averaging start date 73, the averaging end date 74, the minimum price 75, and the settlement date 76. The user would next specify a bid, if he wishes to buy, or an offer, if he wishes to sell, or both 77. In a bid-ask exchange, "ask" refers to a sell order at a specified price, while "bid" refers to a buy order at a specified price. The user next enters conditional cancellation terms 78, including the potential for a price contingency 79. In FIG. 15 is an example of the user interface screen by which a user can view their current position limits and their position risk. This screen would typically be presented to a user prior to a final decision on the user's part to submit a proposed offer (also called deal) for consideration. The positions and position risk are presented to the user for four cases: single deal 90, trader commodity constraints 91, trader portfolio 92, and participant 93 (also called member). For the single deal, the limit available to the user is presented along with the proposed amounts consumed by the proposed deal. The trader commodity constraints 91 are intended to represent constraints imposed on all contracts executed by the trader for a specific commodity or product (e.g. corn or aluminum). The trader portfolio constraints 92 are intended to represent the position limits and the position risk for the user's entire portfolio of contracts. This table also shows the remaining headroom for the trader, which is his remaining available collateral. All of these are shown to the user on a pre-deal 94 and post-deal 95 basis so the user can judge the incremental effects of his proposed contract on position risk. The participant margin and exposure table 93 shows the member's margin and exposure consumption. This table enables the user to see the entire result of the allocation of collateral across all the member's traders. FIG. 16 illustrates the type of information that is presented to the user to facilitate making a decision regarding a contract offer, taking into account both the value of the contract and the effect on the user's position risk. The graphs illustrate probability density 96 and cumulative probability 97 graphs of the value of a proposed contract's impact on the user's portfolio. The probability distributions show the user's total portfolio value before and after the proposed contract. Also shown to the user are the effects of the proposed contract on position risk and the headroom (also called available collateral) remaining 98. FIG. 17 shows one of a plurality of user interfaces for contract negotiation. In order to negotiate contracts, a user must see the available alternatives, and be able to initiate new offers and make responses to existing offers. FIG. 17 begins by dividing the available contracts into markets for corn, soybeans, and wheat 80 so that users can easily identify the contracts of interest. FIG. 17 next divides the contracts into market orders 81 and the user's order book 82 so the user can quickly determine his position and the available contracts that have been authorized by the risk-based permissioning system 4. Alternate presentations of the available contracts would be possible according to user preferences. FIG. 17 also shows important specifications of each contract, including structure 83 (e.g. call, strip), underlying 84 (e.g. December 2002 aka Dec02), date 85, strike price 86 (if the structure is an option), and identifying information 89. The user interface shown in FIG. 17 corresponds to a live bid-ask market, and so both the current bid (to buy) 87 and the current offer (to sell) 88 prices and quantities are shown. Other types of markets (e.g. RFQ) would only show the relevant information. The user knows that the contracts he is viewing have been authorized by the risk-based permissioning system 4, and thus that the counterparties to the contracts shown have sufficient collateral to meet their contractual obligations if the user chooses to accept the terms of an offered contract. Other alternative presentations of the contracts would be understood to be included in this concept.

4. Contract structuring system 10—The contract structuring system 10 utilizes smart templates, which are a unique combination of data structures, business logic, and HTML code intended to facilitate contract structuring. The smart templates are designed to correspond to the visual images the user sees at the user interface 9. Predefined templates can be developed for contract structures enabling exchange members to create and offer proprietary contract structures to a market. The contract structuring system 10 contains data structures and logic that interface with the risk-based permissioning system 4 so that users can structure contracts based in part on their position risk. In some embodiments, the contract structuring system 10 captures previously executed contracts for the purpose of submitting them for clearing and/or authorization of contract assurance.

5. Contract negotiation system 11—The contract negotiation system 11 takes various forms depending on the negotiation style of a specific market. For example, in the preferred embodiment, exchange members can create either a request-for-quote market in which a user structures a contract and requests a price quote; or exchange members can create a live bid-ask mode in which multiple users make bids and offers for standardized contracts, which are entered into an order queue in preparation for matching. The contract negotiation system 11 consists of various logic structures that enable the user to see what contracts are available, to make offers and counteroffers, to accept offers and counteroffers, and to confirm orders. The contract negotiation system 11 contains logic structures that enable users to see the position risk of various potential negotiation actions they might take. Many contract negotiation features could be utilized to enable users to negotiate contracts.

6. Collateral management system 12—The collateral management system 12 enables users to view and manage their available collateral. Since the risk-based permissioning system 4 compares position risk to available collateral, a key user need will be to view the current valuation of collateral, to make deposits or withdrawals, to authorize banking interactions, to authorize guarantees, and to perform any other actions that make or withdraw the availability of collateral. Collateral can be assigned or withdrawn from traders within the members' hierarchical structure of traders, which is illustrated in FIG. 13.

7. Contract management system 13—The contract management system 13 enables the user to see the set of contracts that have been executed and its rights and obligations under those contracts. For example, the user can sort and view contracts by various criteria, can make decisions on exercising options, and can view its obligations to deliver on the terms of the contracts. The existing contracts affect the available collateral for a user, since their current net value represents assets available to users. The system also enables users to forecast the potential for collateral to change over time.

8. Decision support system 14—The decision support system 14 provides assistance to users in making decisions about contracts or proposed contracts. The system enables users to analyze the desirability of proposed or potential contracts, and to forecast potential changes in contract valuation and changes in their position risk. An embodiment of the system enables the user to utilize the risk-based permission system to conduct scenario and decision analyses in which the user may modify control variables, modify state variables, modify the contract portfolio, or utilize its own position-risk supervision system 18 in order to analyze prospective expected values, probability-weighted values, sensitivities, partial derivatives, optimal contracts, optimal contract portfolios, static and dynamic hedges, and position risk estimates.

Next the subsystems of the risk-based permissioning system 4 are discussed, which are presented in FIG. 4. The real-time position risk system 17 and the position risk supervision system 18 have already been discussed.

1. Interprocess communication system 28—The interprocess communication system 28 in the preferred embodiment utilizes the same technology components as in the interprocess communication system 7, thereby enabling an efficient distribution of computing resources. The interprocess communication system 28 is tasked principally with those communications involving the subsystems of the risk-based permissioning system 4.

2. Clearing interface 30—The clearing interface 30 consists of a hierarchical series of templates that present information to one of a plurality of clearing members C and enable various data inputs and instructions to be entered by the clearing member C. The clearing interface 30 enables the clearing member C to see the current status of position risk, transaction history, and contract guarantees. The clearing interface 30 also enables the clearing member C to issue periodic instructions to permit or deny user authorization, to permit or deny various types of collateral, to permit or deny credit authorization, to set the confidence level α for the risk-based permissioning system, to issue instructions controlling the operation of the position risk supervision system 18, to issue instructions controlling the operation of the transaction permission system 27, or to manually set the control variables. The primary purpose of the clearing interface 30 is to enable the clearing member C to exercise control of the risk-based permissioning system 4 at a high level by intervening when necessary to set or reset key control variables, while enabling the real-time position risk system 17 and the transaction permission system 27 to proceed at real time.

3. Collateral system 16—The collateral system 16 in the preferred embodiment enables accounting and valuation of collateral. Collateral may be provided as cash, marketable securities, net capital, existing contracts within the system, insurance contracts, letters of credit, guarantees, or other assets with financial value. The collateral system 16 contains data structures and logic to receive market-based price quotes for standardized collateral from external system, and to apply those to user collateral. The collateral system 16 also contains data structures and logic for liquidating collateral and contract positions in the event of a default or in the event position risk exceeds collateral. In the event a user defaults, the clearing member C can issue instructions through the clearing interface 30 to buy or sell contracts either within the exchange or from authorized external exchanges in order maintain sufficient available collateral. The collateral system 16 also can capture contract positions from other exchanges so as to maintain a complete database of a users contractual commitments.

4. Credit system 19—The credit system 19 enables two facilities that can be used to manage exposure to the potential default of a member: 1) credit exposure matrix and 2) default probability forecast. The credit exposure matrix is a list of maximum position risk exposures for every member and trader authorized to execute contracts. The default probability forecast is an estimate of the probability of default over a given period of time, that the member will experience a default of its obligations on executed contracts. The default probability estimate is used by the position risk supervision system 18 or by the clearing member C to set the control variable $\Omega^x$. The credit exposure matrix is used by the transaction permission system 27 to impose a maximum position risk for a member or trader. The credit system 19 can also capture financial data for a user and condition the default probability on that data.

5. Contract guarantee system 15—The contract guarantee system 15 enables the valuation of a contract to guarantee one or a plurality of contracts. Contract guarantees are an alternative to other forms of collateral for a user. A contract guarantee can be provided by the clearing member C or by a third party with whom a pre-arranged assurance contract has been executed. The contract guarantee system 15 enables the estimation of the cost of the guarantee, a fee charged for providing the guarantee, and the reporting of contracts under guarantee. Contract guarantees may be provided for individual contracts, or for portfolios of contracts either for an individual user or for a plurality of users and contracts.

6. Transaction permission system 27—The transaction permission system 27 compares the position risk calculation, provided by the real-time position risk system 17; compares it to the collateral valuation from the collateral system 16, imposes constraints on position, provided by the credit system 19; and makes a decision to permit or deny the proposed contract. The transaction permission system 27 also contains data structures and logic that enable comparisons of user positions against position limits established by the clearing member C (which may be motivated by either regulatory constraints or by rules established by the clearing member C or an exchange member D), and logic to block transactions that exceed those position limits. Position limits may be conditioned on quantity, total contracts within a user portfolio, member or trader portfolios, or any other limitation placed on a contract or portfolio data element maintained by the transaction system 2. Additionally, the transaction permission system 27 receives messages from the audit system 20 that may deny authorization for user trading activity based on the real-time surveillance of activity conducted by the audit system 20.

Next, the subsystems of the transaction system 2 are discussed, which are presented in FIG. 5.

1. Interprocess communication system 29—The interprocess communication system 29 in the preferred embodiment utilizes the same technology components as in the interprocess communication system 7, thereby enabling an efficient distribution of computing resources. The interprocess communication system 29 is tasked principally with those communications involving the subsystems of the transaction system 2.

2. Administrative interface 31—The administrative interface 31 consists of a hierarchical series of templates that present information to one of a plurality of exchange members D and enable various data inputs and instructions to be entered by the exchange member D. The templates enable an exchange member D to create and maintain exchanges, markets, contracts, contract elements, member and trader accounts, clearing member accounts, maintain fee schedule, review and approve invoices, view the audit history, view system reports, and other data and logic structures that enable operation of the exchange and its permissioning features.

3. Administration system 21—The administration system 21 provides data structures and logic enabling creation and maintenance of user accounts, creation and maintenance of clearing member accounts, creation and maintenance of contract markets, regulatory requirements, available collateral, automated reporting and invoicing, and other data structures and logic required to operate an exchange.

4. Audit system 20—The audit system 20 maintains a complete real-time record of all messages communicated among the system of the exchange and all its subsystems. The major systems 1,2,3,4 are governed by interprocess communication systems utilizing a common communication framework, and each message is stored within the audit system 20 for review and analysis. The audit system 20 contains data and logic structures to identify sequences of activity that may be prohibited by exchange rules. The audit system 20 can conditionally send a message alert in real time to the exchange member D and to the transaction permission system 27 enabling or prohibiting transactions by users.

5. Order management system 22—The order management system 22 receives orders from client applications 1,3 and controls the storage of orders and the forwarding of orders to other systems and to other client applications. Several types of order management are available in the preferred embodiment. These types are distinguished by the priority of order processing, the conditional or immediate action desired by the user, and the set of users and exchanges to which the order may be communicated. The order management system, on receiving an order, sends the order to the risk-based permissioning system 4 for approval or denial, and then takes appropriate action. If the transaction is approved, the order management system enables display of the order to other users and/or other exchanges. The exchange member D can set authorizations for display of new orders that limit the users or exchanges that may view an order, based on contract or market type and based on user-level authorizations. There are a wide variety of order types, including but not limited to market orders, limit orders, and conditional orders.

6. Order matching system 23—The order matching system 23 enables the transaction system 2 to match orders that are identical or fall within a prescribed range of criteria. A wide variety of order matching styles can be utilized. These include but are not limited to limit order queues, hard matching, soft matching, request for quote, request for proposal, partial matching, and prioritized matching. The matching system 23 can be applied to both bilateral and multilateral matching. The order matching system 23 finds a matched set of contract offers according to the matching rules, and communicates the matched trade to the contract execution system 24. In finding a match, the order matching system 23 may employ a variety of data structures, queues, and processing that order, prioritize, split, combine, and/or modify orders according to exchange rules.

7. Contract execution system 24—The contract execution system 24 performs the steps necessary to form a legally binding contract on the users who initiated the matched offers and acceptances. The contract execution system 24 may (or may not according to the exchange rules) request from the risk-based permissioning system 4 a final position risk check on each user to ensure that adequate collateral is available after changing market conditions, collateral allocations, and/or contract portfolios since the orders were approved. When a legally binding contract is determined, the contract execution system 24 stores the result, notifies the client applications 1,3 and notifies other systems, as needed.

8. Contract settlement system 25—The contract settlement system 25 maintains a database of executed contracts and the logic to notify users of impending decisions, settlements, and deliveries they may be required to make. The contract settlement system 25 also contains data structures and logic to identify failure on the part of a user to meet its contract obligations. In that event, a message is sent to the credit system 19, to the collateral system 16, and to the administration system 21.

9. Contract element price system 26—The contract element price system 26 maintains data structures and logic enabling price streams to be created and maintained for use by the risk-based permissioning system 4. Price streams are created by merging price data from external systems 5 that are sources of price data with internal sources of price data that are created within the exchange. The contract element price system 26 contains data structures and logic necessary to decompose contracts that are combinations of contract elements to impute prices for each of the embedded contract elements. The contract element price system 26 also maintains data structures and logic necessary to combine price data from various sources, and to produce a single price stream for each reference product. The contract element price system also maintains data structures and logic necessary to compute indices that are defined by one of the plurality of exchange members D. The contract element price system 26 may also precompute various intermediate results used by the real-time position risk system 17, and store the results for access by the real-time position risk system 17.

Next, the external systems 5 that are sources and recipients of information are discussed. The preferred embodiment is implemented as a distributed array of input, output, storage, and processing units in which both data and logic may be geographically separated on a global basis communicating through a network interconnecting the units. This structure enables 1) any of the subsystems to be executed by an external source, 2) coordination of transactions with external exchanges, 3) reporting and coordination with regulatory agencies of the government, and 4) redundant systems to increase reliability and system responsiveness. In the preferred embodiment, price data is provided by external vendors who maintain and distribute data via the network 6 about contract elements that are aggregated from many separate exchanges. In the preferred embodiment, the real-time position risk system 17, the collateral system 16, and the transaction permission system 27 are operated and maintained by a separate vendor specializing in clearing services. In the preferred embodiment, the credit system 19 queries an external vendor for a current default probability estimate for a specified member. In the preferred embodiment, the contract guarantee system 15 is operated by an external vendor. In the preferred embodiment, many of the various layers of the interprocess communications systems 7, 28, 29 are performed by systems available from external vendors. In the preferred embodiment, external recipients of reports and information may include regulatory agencies or self-regulatory supervisory organizations.

Figure 19:
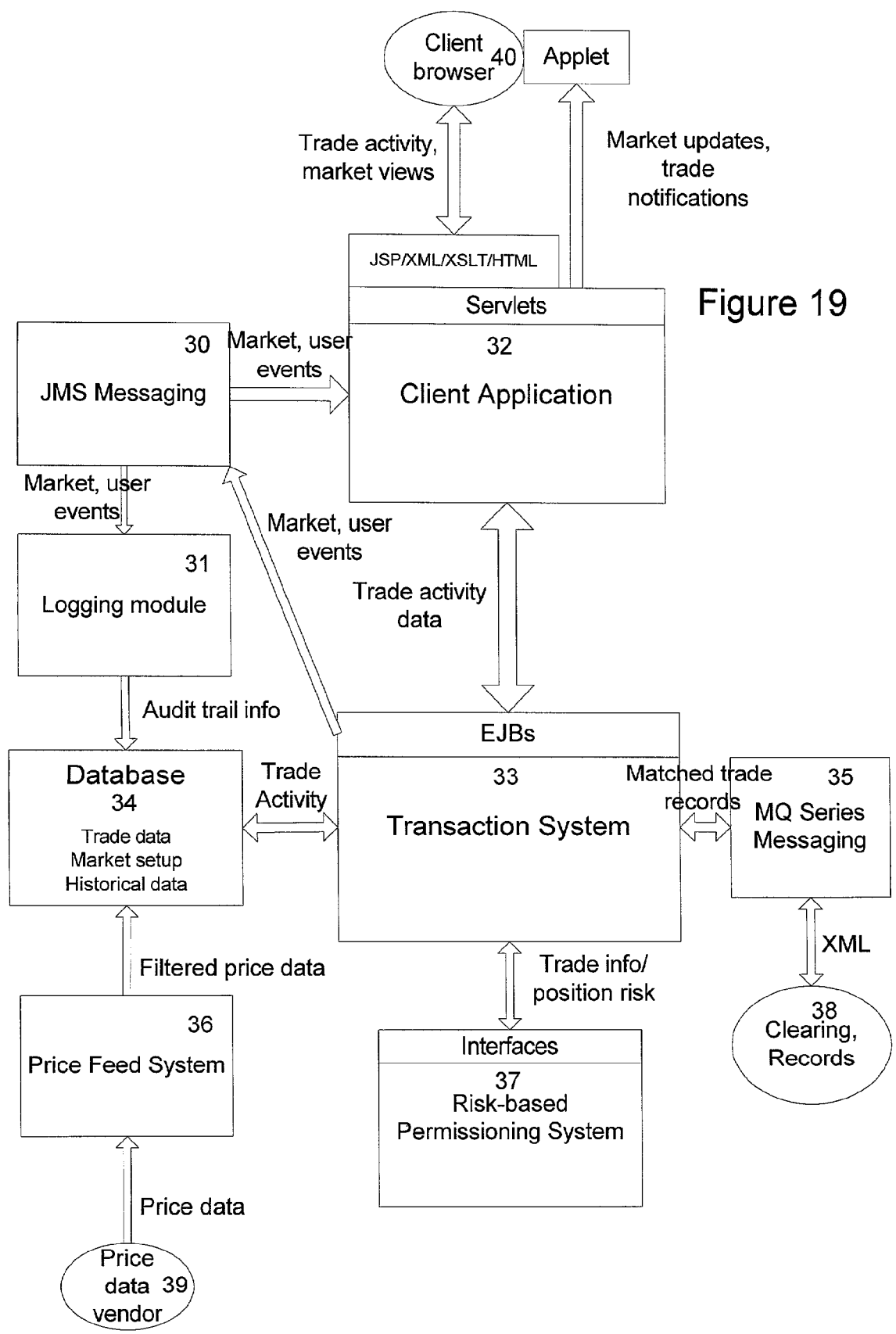
FIG. 19 illustrates the interactions of some of the plurality of systems in the preferred embodiment.

FIG. 19 provides a high-level overview of the interaction of several of the plurality of system components in the preferred embodiment. The central interaction occurs between the transaction system 33, which handles trade activity; the client application 32, which handles client interactions; and external sources or recipients of information 30, 38, 39. The transaction system 33 enables access to the subsystems described in FIG. 5, through an application server, enabling distributed data and logic within a parallel and distributed computing network. In the preferred embodiment, the transaction system 33 provides trade activity data to the client application 32, which in turn is formatted and presented to the client browser 40 using the technology tiers described above. The client application 32 additionally can directly receive external sources of market and user events through the JMS messaging system 30. The JMS messaging system 30 also receives market and user event data from the transaction system 33, which is provided to the logging module 31 for audit purposes. In the preferred embodiment, price streams are provided by an external price data vendor 39, through a price feed system 36, which receives and formats the price data, and then stores the price streams in the database 34. The transaction system 33 receives requests for position risk calculations from one of the subsystems of the transaction system 33, the client application 32, or the risk-based permissioning system 37. The transaction system 33 accesses the necessary data from the database 34 (e.g. price data, precomputed variables used in the real-time position risk system 17, control variable settings, user portfolio data), and sends it to the risk-based permissioning system 37 for processing. The risk-based permissioning system 37 receives the necessary data, computes the position risk utilizing the real-time position risk system 17, and returns the requested position risk computations and/or permissions. The transaction system 33 also handles external communications (e.g. matched trade records) with clearing and recordkeeping functions 38 through the MQ series messaging system 35, using the XML protocols.

A typical sequence of steps will occur as follows:

1. A market initialization process is first conducted in which exchange members, underlying reference products, contract types, price data, and projected contract valuation and positions risk are analyzed.

2. The market initialization procedures utilize the position risk algorithms of the risk-based permissioning technology to quantitatively project the manner in which a proposed market would operate with dynamic risk-based permissioning capabilities and multi-parametric exchange capabilities.
3. Utilizing suitable risk-based criteria, a market framework is developed that defines allowed deal elements, allowed contract templates, Smart Templates that the user will interact with, the confidence levels required for transaction permissioning, and the method of assuring contract performance.
4. After a market framework is implemented, members can be considered for trading privileges. Initial procedures include completing an application, providing suitable financial and credit data, and completing the required legal documents.
5. The member authorization procedures utilize the position risk algorithms of risk-based permissioning to help determine appropriate position risk limits for the members and the traders. These limits must account for the creditworthiness of the members, and well as the contracts they are permitted to trade.
6. Transactions are initially created by selecting a pre-defined contract template and filling in as many options (including, for example, quantity, price, expiration date, etc.) as the user desires. These choices are made using electronic screens that are called "smart templates". An example of these smart templates is shown in FIG. 14. A fully completed smart template is considered well formed and is ready for permissioning. In some implementations, less than well-formed contract proposals are permitted (e.g. requesting a quote for a defined quantity and delivery date, requesting a market order by leaving the price filed blank).
7. In the process of creating an initial contract proposal, a variety of risk-based decision support capabilities can be provided to the user. These include collateral estimation, trader control checks, as well as valuation and valuation sensitivity analyses. An example of the trader control check is shown in FIG. 15. An example of a forecasted portfolio value sensitivity is shown in FIG. 16.
8. In providing these checks, the analytic routines used in the risk-based permissioning position risk calculations are again utilized. This approach ensures an accurate forecast of the position risk coverage that a proposed contract will require.
9. When the user has assured himself of the appropriateness of a contract he creates, the deal is posted to the trading system. But, the proposed trade will first be subjected to a risk-based permission check before any other member is allowed to respond to the proposed contract.
10. A first set of permission checks ensures that the trader is not exceeding limits on contract size, allowed contract types, notional value, etc. These checks are performed by comparing the member and exchange authorization parameters with the current proposed contract parameters. In some cases, the limitations will be exchange wide (e.g. maximum allowed notional quantity controlled), and some limitations will be trader specific (e.g. allowed contract type).
11. The parameters of the proposed deal are sent by XML messages (in the preferred embodiment) to the business process for a second set of permission checks to ensure that the financial capacity of the trader's position risk limits is not exceeded prior to posting a proposed contract. A variety of methods can be utilized by a member to meet its financial exposure, as measured by position risk. These include collateral, performance bonds, letters of credit, and third party assurance contracts. The current implementation of this business process utilizes a third-party clearing house to manage posted collateral and to conduct a comparison against position risk.
12. Position risk is calculated for the trader and the member on their entire portfolio (including the proposed contract). This algorithm may be computed on multiple machines that are separated geographically, but will produce the same position risk estimates.
13. The position risk is then compared to the available collateral of the member, and the contract proposal is either authorized or denied. FIG. 17 illustrates the list of authorized contracts that are posted and available to buyers. (Steps 10-13 are completed within a level of timeliness for required modern exchange order matching.)
14. A sequence of offers and counter offers can be conducted between buyers and sellers on any given contract. These sequences of offers and counter offers may be conducted in parallel and simultaneously until one party accepting the most recent proposed contract reaches an agreement. At that point, other negotiation threads are cancelled. Each offer and each counter offer can be exposed to the sequence of steps 10-13. For example, a buyer may see a current proposed contract on the screen in FIG. 17 and want to accept the terms of the contract proposed at the price proposed. At the moment the buyer proposes to accept the contract terms, the full set of permissioning checks is conducted starting with step 10 and proceeding through step 13.
15. On certification of a completed contract, both counter party's accounts are updated. Any new contract proposals will reflect the changes to each trader's risk profile. For example, if a completed contract reduced the financial risk of the portfolio of contracts, the total collateral or performance bond would be reduced for the next proposed contract. Contract portfolios are periodically monitored for changing risk levels in response to changing price levels. On a periodic schedule, contracts are marked to market value and trader accounts are updated. Position risk is recalculated and required adjustments to collateral or performance bonds are made. Contracts are also monitored for expiration conditions, and when a contract requires settlement, the terms of the contract are carried out, monitored, and certified.
16. In the event of a default by either counter party, a sequence of default processes are initiated. A default is a failure by a member to meet its contract obligations. The default process may include requiring additional collateral or liquidation of the trader's existing portfolio of contracts. "Liquidation" means to take such buy and/or sell actions as are necessary to reduce the position risk of a portfolio so that it is less than available collateral. In the case of contract elements that can be netted, "liquidate" means that the short or long position is reversed so that the contract elements no longer remain in the portfolio. In the case of contract elements that cannot be netted, "liquidate" means that an opposite position in each contract element is taken so as to cause the net contractual commitment to be zero. These procedures utilize the position risk algorithms to monitor changes in the member's portfolio as the portfolio is liquidated and/or collateral is added.

The following sequence of steps demonstrates how these are utilized in the preferred embodiment:
1. The initial market framework of deal elements and allowed contract types is created.
2. The initial position risk limits of traders and members are chosen.
3. A credit score or probability of default prediction is obtained.
4. A simulation or other risk supervision calculation is utilized to create an initial setting of the control variables used in the real-time portion of risk-based permissioning.
5. One of the systems described above (e.g. the transaction system 2 or the decision support system 14) initiates a call on the services of the real-time component of the risk-based permissioning system
6. Position risk is calculated for the proposed contract given the member's current portfolio.

The process integrates contract negotiation, contract execution, collateral management, hedge effectiveness determination, customer supervision, and default risk management into one comprehensive set of business processes. The steps achieve several objectives hitherto unavailable: 1) the business process determines margin sufficiency at the point in time when a transaction is proposed, 2) the process eliminates the need for a member to take on the liability of order execution, 3) the process enables the exchange to manage risk, taking into account both market and credit risk, 4) the process enables the exchange to more closely monitor the risk position of the counter parties it is guaranteeing, 5) enables synthetic capital to underwrite default risk priced according to agency rating status, 6) enables real-time market supervision to reduce potential for price manipulation, 7) enables direct customer-to-customer negotiation without the intervention of an order taking/customer supervision role (bypassing executors), 8) enables integration of trader controls into transaction permissioning, 9) enables hedge effectiveness determination at the point of order execution, 10) enables dynamic exchange controls responsive to fast changing markets, and 11) enables faster and more frequent settlement processes.

Preferred implementations are described below to provide examples. However, these examples are not to be interpreted as an exhaustive listing of uses for the invention.

The preferred embodiment is an electronic exchange for structured contracts conducted using a system of interconnected terminals and processing units. This would include computer networks, storage networks, Internet facilities, personal computers, personal digital assistants, electronic agents, and other similar devices that enable communication across distance combined with rapid processing of inputs. This system embodies a range of physical media that enable instantaneous or near instantaneous communications, in support of time-critical contracting processes. The system also enables similar capabilities at various time intervals, including hourly, daily, weekly, monthly, among others. The system can be implemented in a machine automated manner, or can be implemented as a partially manual system, or some combination. Exchange rules can define an arbitrary set of order types, contract types, and matching algorithms.

An additional embodiment is an electronic exchange for standardized contracts in which it is desired to employ real-time margin calculations, which are applied prior to contract matching.

An additional embodiment is a request-for-quote (RFQ) system. The present invention can be used by a entity that wishes to define proposed contracts and request prices and quotations from a set of potential vendors or bidders. The present invention enables an RFQ system that can assure vendors present a consistent risk level across solicited contracts, accounting for market and credit risk.

An additional embodiment is an order-taking system. The present invention can be used by an entity that wishes to enable customers to define requirements they need fulfilled, and to request availability information and pricing. The present invention enables a consistent credit management system that maintains a preset level of risk.

An additional embodiment would be a super exchange composed of multiple interacting exchanges. A challenge in such a multiple hierarchy of globally distributed exchanges is assuring that orders transmitted from one exchange to another are both valid and that the initiating user possesses sufficient collateral. The present invention solves this challenge by using the risk-based permissioning system to assure sufficient collateral exists prior to permissioning and transmitting an order to another exchange.

An additional embodiment would be a contract guarantee netting system. The system can be employed to calculate the money value of a parental guarantee against a contract, and to net a set of guarantees across a group of traders. This situation commonly arises in the over-the-counter markets when bilateral contracts have terms that require parental guarantees or guarantees underwritten by third parties. In these situations, three or more party cycles of guarantees can exist such that they would cancel in the event of default. However, tracking these cycles, and netting the guarantees based on risk levels has proven to be a challenge due to time varying price and credit risks, and due to the lack of a standardized system to perform risk-based netting. The present invention can be applied to overcome these challenges.

An additional embodiment would be a contract assurance service. The present invention enables the pricing and assurance of contracts, for which assurance against default is desired. Challenges for providing contract assurance have been automating the quotations for complex structured contracts, netting risk-based assurance fees across a portfolio of contracts, and pricing assurance contracts based on portfolio risk levels that may vary over time. The present invention can be applied to continuously monitor and price the varying risks of a portfolio of structured contracts, report the results periodically, and automate the contract assurance service.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer implemented method for negotiating contracts between a plurality of participants, comprising:
    creating a structured contract from a plurality of different deal elements by a first participant of the plurality of participants by a client application running on a computer system, wherein the client application provides a user interface to the computer system for the first participant;
    calculating a position risk of the first participant by a risk-based permissioning system of the computer system, wherein the position risk is a real-time position risk algorithm, the real-time position risk algorithm comprising real-time value at risk of a portfolio of structured contracts of the first participant and a credit rating of the first participant, wherein the credit rating is a credit score obtained from a remote system;

calculating a real-time collateral valuation of the first participant by a collateral system, the collateral valuation taking into account the current positions of the portfolio of structured contracts of the first participant;

comparing the calculated real-time position risk of the first participant with the calculated real-time collateral valuation of the first participant by a transaction permission system of the computer system;

blocking the structured contract by the transaction permission system, if the real-time position risk of the first participant is greater than the real-time calculated collateral valuation of the first participant; and forming the structured contract by the transaction system of the computer system, if the real-time position risk of the first participant is less than the collateral of the first participant.

2. The computer implemented method, as recited in claim 1, further comprising:

receiving an order from a second participant;

calculating a position risk of the second participant;

blocking the order from the second participant if the position risk of the second participant is in a first condition for the second participant; and binding the first participant and the second participant into a contract based on the order from the first participant and the order from the second participant if the position risk of the second participant is in a second condition for the second participant and the order from the second participant is available for forming into a contract.

3. The computer implemented method, as recited in claim 2, wherein the first condition for the second participant is that the position risk of the second participant is greater than collateral of the second participant, and wherein the second condition for the second participant is that the position risk of the second participant is less than the collateral of the second participant.

4. The computer implemented method, as recited in claim 2, wherein making the structured contract available for forming the contract comprises forwarding the structured contract to at least the second participant of the plurality of participants, wherein the order received from the second participant is in response to the structured contract from the first participant.

5. The computer implemented method, as recited in claim 1, further comprising:

matching the structured contract from the first participant which is available for forming into a contract with an order from a second participant that matches criteria of the structured contract from the first participant, wherein a position risk of the second participant has been calculated;

binding the first participant and the second participant into the contract based on the structured contract from the first participant and the order from the second participant if the position risk of the second participant is in a first condition for the second participant;

storing data regarding the contract; and using the data regarding the contract to determine the position risk of the first participant and the position risk of the second participant, wherein the binding occurs after the calculating the position risk of the first participant, and wherein the calculating the position risk of the first participant is performed in real time.

6. A computer system for providing an exchange for forming structured contracts comprising a plurality of different deal elements between a plurality of users, comprising:

a transaction system connected to a plurality of client applications over a network, wherein the transaction system comprises:

an order management system for managing orders received from the plurality of users, wherein at least one order is for a structured contract comprising the plurality of different deal elements;

an order matching system for comparing orders received from the plurality of users to find matching orders; and a contract execution system for combining matched orders to form a legally binding contract;

a permissioning system, configured to calculate a position risk of a first participant, wherein the position risk is a real-time position risk algorithm, the real-time position risk algorithm comprising real-time value at risk of a portfolio of structured contracts of the first participant and a credit rating of the first participant, wherein the credit rating is a credit score obtained from a remote system;

a collateral system configured to calculate a real-time collateral valuation of the first participant, the collateral valuation taking into account the current positions of the portfolio of structured contracts of the first participant;

a transaction permission system configured to compare the calculated real-time position risk of the first participant with the calculated real-time collateral valuation of the first participant and further configured to:

block the structured contract if the real-time position risk of the first participant is greater than the real-time calculated collateral valuation of the first participant; and form the structured contract, if the real-time position risk of the first participant is less than the collateral of the first participant.

7. The computer system, as recited in claim 6, further comprising a storage system for storing the legally binding contract, wherein the real- time positioning position risk system receives contract data from the storage system to calculate the position risk, and wherein the real time position risk system uses a combination of analytic and Monte Carlo methods.

8. An executable computer program tangibly recorded on computer readable media able to cause at least one computing device to provide for negotiating structured contracts between a plurality of participants, comprising:

computer executable code for creating a structured contract from a plurality of different deal elements by a first participant of the plurality of participants;

computer executable code for calculating a position risk of the first participant, wherein the position risk is a real-time position risk algorithm, the real-time position risk algorithm comprising real-time value at risk of a portfolio of structured contracts of the first participant and a credit rating of the first participant, wherein the credit rating is a credit score obtained from a remote system;

computer executable code for calculating a real-time collateral valuation of the first participant, the collateral valuation taking into account the current positions of the portfolio of structured contracts of the first participant;

computer executable code for comparing the calculated real-time position risk of the first participant with the calculated real-time collateral valuation of the first participant and blocking the structured contract, if the real-time position risk of the first participant is greater than the real-time calculated collateral valuation of the first or forming the structured contract, if the real-time position risk of the first participant is less than the collateral of the first participant.

9. The computer executable code, as recited in claim 8, further comprising:
   computer executable code for receiving an order from a second participant;
   computer executable code for calculating a position risk of the second participant;
   computer executable code for blocking the order from the second participant if the position risk of the second participant is in a first condition for the second participant; and
   computer executable code for binding the first participant and the second participant into a contract based on the structured contract from the first participant and the order from the second participant if the position risk of the second participant is in a second condition for the second participant and the order from the second participant is available for forming into the contract.

10. The computer executable code, as recited in claim 9, wherein the first condition for the second participant is that the position risk of the second participant is greater than the collateral of the second participant, and wherein the second condition for the second participant is that the position risk of the second participant is less than the collateral of the second participant.

11. The computer executable code, as recited in claim 9, wherein the computer readable code for making the structured contract available for forming the contract comprises computer readable code for forwarding the structured contract to at least the second participant of the plurality of participants, wherein the order received from the second participant is in response to the structured contract from the first participant.

12. The computer implemented method, as recited in claim 2, wherein at least one deal element of the plurality of different deal elements is one of a type of option, future, Asian option, binary options, knock-in/out options, swaps, swaptions, or American options, and wherein the plurality of different deal elements are different types of deal elements.

13. The computer implemented method, as recited in claim 12, wherein at least one deal element of the plurality of different deal elements is traded over-the-counter.

* * * * *